(12) United States Patent
Kondoh et al.

(10) Patent No.: US 7,904,246 B2
(45) Date of Patent: Mar. 8, 2011

(54) VEHICLE DRIVING ASSIST SYSTEM

(75) Inventors: Takayuki Kondoh, Yokohama (JP); Yasuhiro Matsushita, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 1147 days.

(21) Appl. No.: 11/491,914

(22) Filed: Jul. 25, 2006

(65) Prior Publication Data

US 2007/0032914 A1 Feb. 8, 2007

(30) Foreign Application Priority Data

Aug. 5, 2005 (JP) .................................. 2005-228494

(51) Int. Cl.
*G08G 1/16* (2006.01)

(52) U.S. Cl. ............. 701/301; 701/36; 701/96; 340/903; 340/435; 340/436; 180/167

(58) Field of Classification Search ................ 701/1, 36, 701/70, 93, 96, 301; 340/903, 435, 436; 180/167, 168, 169, 170
See application file for complete search history.

(56) References Cited

U.S. PATENT DOCUMENTS

| | | | |
|---|---|---|---|
| 6,332,108 B1 * | 12/2001 | Hirasago ......................... | 701/93 |
| 6,338,022 B1 * | 1/2002 | Shinmura et al. ............. | 701/301 |
| 6,571,176 B1 * | 5/2003 | Shinmura et al. ............. | 701/301 |
| 2003/0060936 A1 | 3/2003 | Yamamura et al. | |
| 2004/0066376 A1 * | 4/2004 | Donath et al. ................ | 345/169 |
| 2004/0090320 A1 | 5/2004 | Suzuki et al. | |
| 2004/0167702 A1 * | 8/2004 | Isogai et al. ................... | 701/96 |
| 2005/0060069 A1 * | 3/2005 | Breed et al. ..................... | 701/29 |
| 2005/0096829 A1 * | 5/2005 | Sugano et al. .................. | 701/70 |
| 2005/0110348 A1 * | 5/2005 | Hijikata et al. ............. | 307/10.1 |
| 2005/0279554 A1 * | 12/2005 | Kobayashi et al. ........... | 180/197 |
| 2006/0190175 A1 * | 8/2006 | Moriizumi et al. ........... | 701/301 |

FOREIGN PATENT DOCUMENTS

CN     2115258 U     9/1992

(Continued)

OTHER PUBLICATIONS

The Office Action of corresponding Chinese Application No. 2006101095343, dated Dec. 28, 2007.

(Continued)

*Primary Examiner* — Thomas G Black
*Assistant Examiner* — Ce Li
(74) *Attorney, Agent, or Firm* — Global IP Counselors, LLP

(57) ABSTRACT

A vehicle driving assist system is configured to provide a driver with advanced notification regarding changes in the operating states of the controls when several controls are being executed. The vehicle driving assist system has a controller configured to execute an accelerator pedal actuation reaction force control based on a risk potential that indicates a degree of convergence between the host vehicle and a preceding obstacle and an automatic braking control based on the possibility of contact between the host vehicle and the preceding obstacle. When the automatic braking control will change from a low operating state to a high operating state while an actuation reaction force is being generated in the accelerator pedal in accordance with the risk potential, a pulsed supplemental reaction force is generated in the accelerator pedal and an alarm sound is generated.

14 Claims, 21 Drawing Sheets

| | ACCELERATOR PEDAL | AUTOMATIC BRAKING CONTROL | OBJECTIVE | METHOD OF CONVEYING INFORMATION |
|---|---|---|---|---|
| 1 | ON | LOW→HIGH | ADVANCE NOTIFICATION OF VEHICLE BEHAVIOR CHANGE | GENERATE SUPPLEMENTAL REACTION FORCE AND SOUND ALARM IN ADVANCE |
| 2 | ON | HIGH→LOW | ADVANCE NOTIFICATION OF VEHICLE BEHAVIOR CHANGE | STOP VIBRATION OF PEDAL IN ADVANCE |
| 3 | OFF→ON | HIGH | MAKE DRIVER AWARE THAT CONTROL IS IN HIGH OPERATING STATE | INCREASE PEDAL REACTION FORCE FOR PRESCRIBED AMOUNT OF TIME |
| 4 | ON→OFF | HIGH | – – | – – |
| 5 | OFF | LOW→HIGH | NOTIFY IN ADVANCE THAT VEHICLE BEHAVIOR WILL CHANGE | GENERATE ALARM SOUND IN ADVANCE |
| 6 | OFF | HIGH→LOW | – – | – – |
| 7 | ON/OFF | LOW | – – | – – |

FOREIGN PATENT DOCUMENTS

| | | |
|---|---|---|
| EP | 1285842 A2 | 2/2003 |
| EP | 1327552 A2 | 7/2003 |
| JP | S62-23832 | 1/1987 |
| JP | H10-11700 | 1/1998 |
| JP | 2001-273597 | 10/2001 |
| JP | 2004-17930 | 1/2004 |
| JP | 2004-34792 | 2/2004 |
| JP | 2004-203387 | 7/2004 |
| JP | 2005-112242 | 4/2005 |
| JP | 2005-112243 A | 4/2005 |
| JP | 2005-125935 A | 5/2005 |

OTHER PUBLICATIONS

The Office Action of corresponding Chinese Application No. 2006101095343, dated Sep. 26, 2010.

* cited by examiner

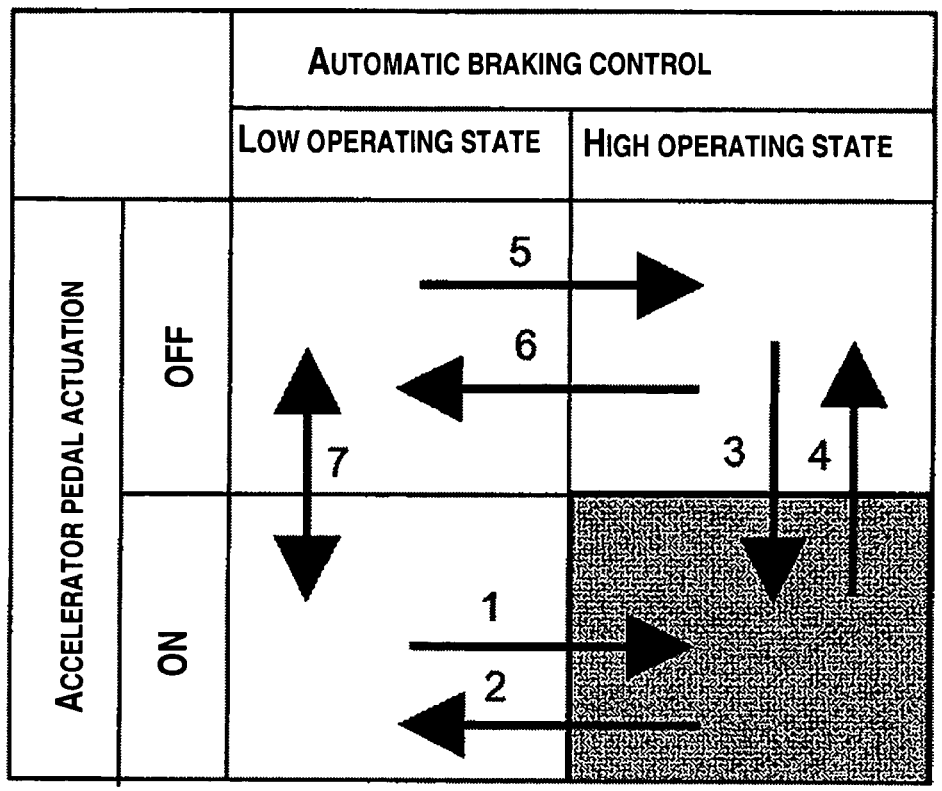
Fig. 8
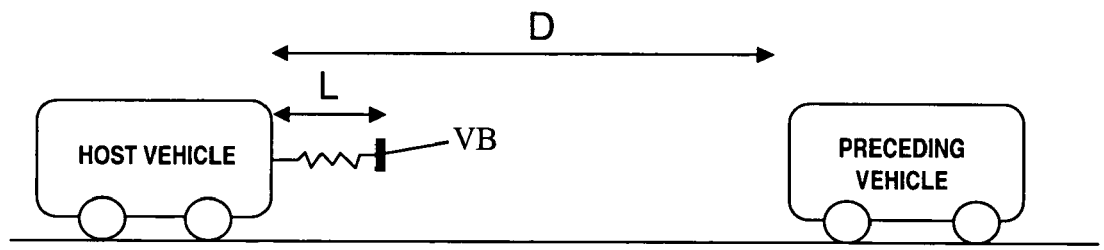
(a) CASE WHEN THE DISTANCE BETWEEN BOTH VEHICLES IS LONG
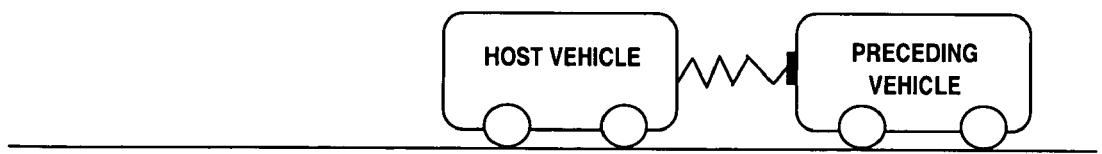
(b) CASE WHEN THE DISTANCE BETWEEN BOTH VEHICLES IS SHORT
Fig. 9

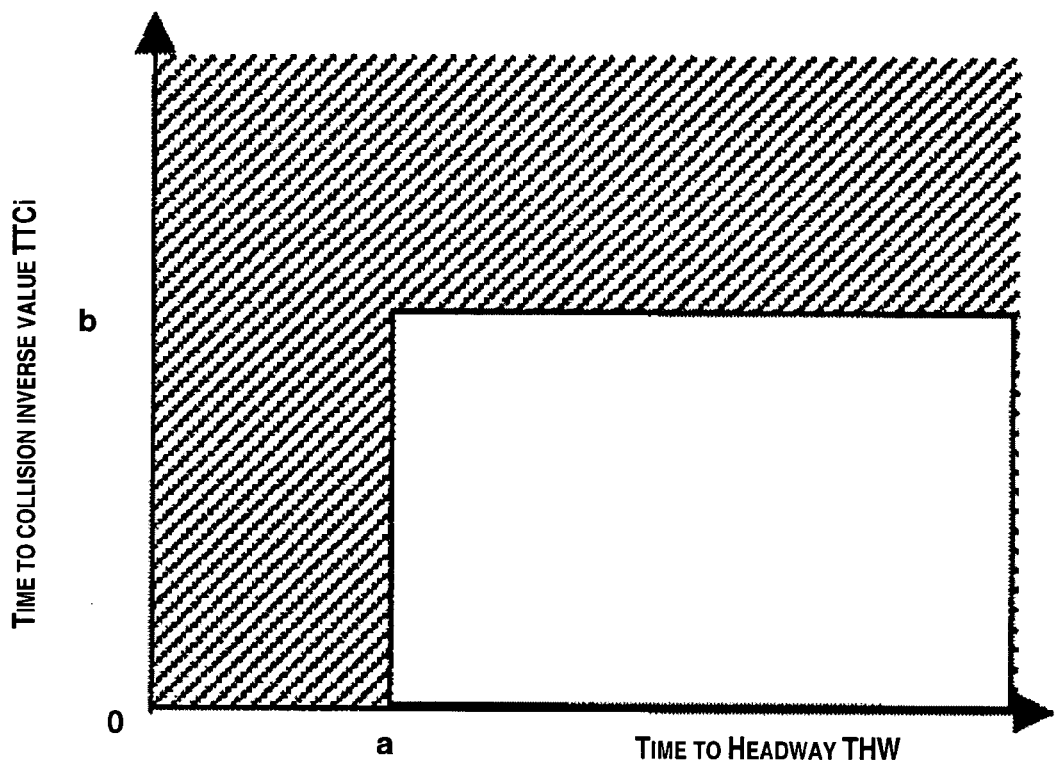

Fig. 10

| | ACCELERATOR PEDAL | AUTOMATIC BRAKING CONTROL | OBJECTIVE | METHOD OF CONVEYING INFORMATION |
|---|---|---|---|---|
| 1 | ON | LOW→HIGH | ADVANCE NOTIFICATION OF VEHICLE BEHAVIOR CHANGE | GENERATE SUPPLEMENTAL REACTION FORCE AND SOUND ALARM IN ADVANCE |
| 2 | ON | HIGH→LOW | ADVANCE NOTIFICATION OF VEHICLE BEHAVIOR CHANGE | STOP VIBRATION OF PEDAL IN ADVANCE |
| 3 | OFF→ON | HIGH | MAKE DRIVER AWARE THAT CONTROL IS IN HIGH OPERATING STATE | INCREASE PEDAL REACTION FORCE FOR PRESCRIBED AMOUNT OF TIME |
| 4 | ON→OFF | HIGH | – – | – – |
| 5 | OFF | LOW→HIGH | NOTIFY IN ADVANCE THAT VEHICLE BEHAVIOR WILL CHANGE | GENERATE ALARM SOUND IN ADVANCE |
| 6 | OFF | HIGH→LOW | – – | – – |
| 7 | ON/OFF | LOW | – – | – – |

Fig. 11

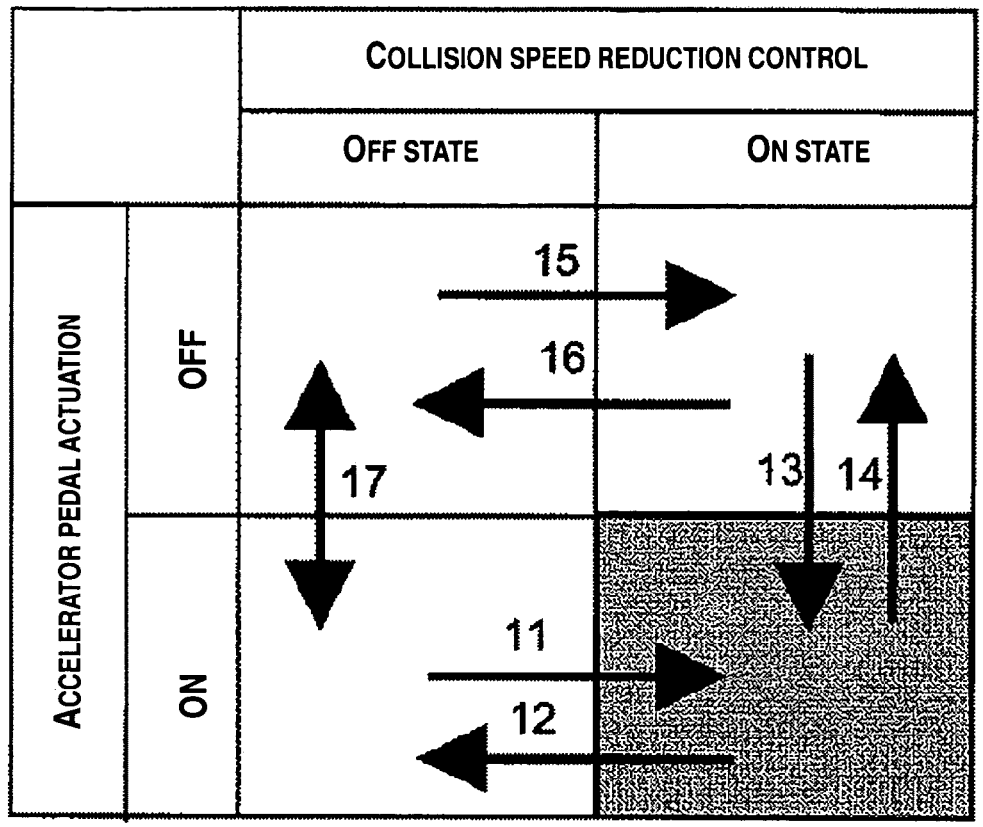

Fig. 19

| | Accelerator Pedal | Automatic Braking Control | Objective | Method of Conveying Information |
|---|---|---|---|---|
| 11 | ON | LOW→HIGH | Advance notification of vehicle behavior change | Generate supplemental reaction force and alarm sound in advance |
| 12 | ON | HIGH→LOW | Advance notification of vehicle behavior change | Stop vibration of pedal in advance |
| 13 | OFF→ON | HIGH | Make driver aware that control is in high operating state | Increase pedal reaction force for prescribed amount of time |
| 14 | ON→OFF | HIGH | - - | - - |
| 15 | OFF | LOW→HIGH | Advance notification of vehicle behavior change | Generate alarm sound in advance |
| 16 | OFF | HIGH→LOW | - - | - - |
| 17 | ON/OFF | LOW | - - | - - |

Fig. 20

|    | ACCELERATOR PEDAL | AUTOMATIC BRAKING CONTROL | OBJECTIVE | METHOD OF CONVEYING INFORMATION |
|----|---|---|---|---|
| 21 | ON | OFF→ON | ADVANCE NOTIFICATION OF VEHICLE BEHAVIOR CHANGE | GENERATE SUPPLEMENTAL REACTION FORCE AND ALARM SOUND IN ADVANCE |
| 22 | ON | ON→OFF | ADVANCE NOTIFICATION OF VEHICLE BEHAVIOR CHANGE | STOP VIBRATION OF PEDAL IN ADVANCE |
| 23 | OFF→ON | ON | MAKE DRIVER AWARE THAT LDP CONTROL IS ON | INCREASE PEDAL REACTION FORCE FOR PRESCRIBED AMOUNT OF TIME |
| 24 | ON→OFF | ON | - - | - - |
| 25 | OFF | OFF→ON | ADVANCE NOTIFICATION OF VEHICLE BEHAVIOR CHANGE | GENERATE ALARM SOUND IN ADVANCE |
| 26 | OFF | ON→OFF | - - | - - |
| 27 | ON/OFF | OFF | - - | - - |

Fig. 27

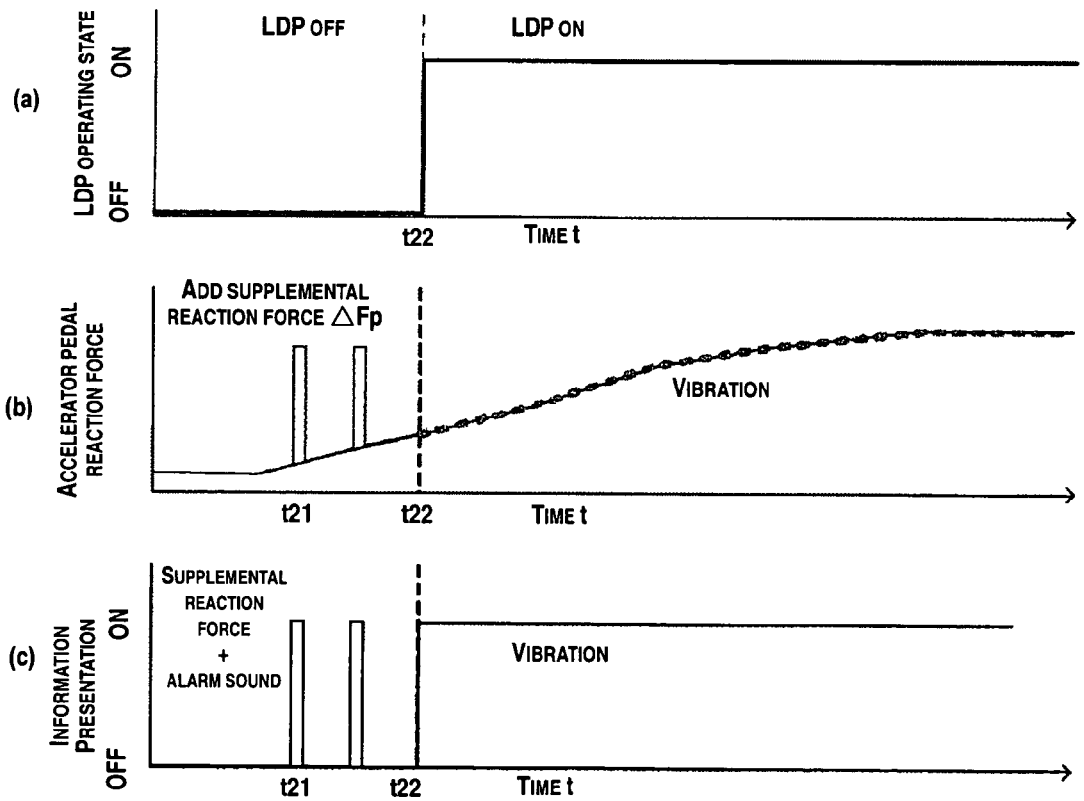

VEHICLE DRIVING ASSIST SYSTEM

CROSS-REFERENCE TO RELATED APPLICATIONS

This application claims priority under 35 U.S.C. §119 to Japanese Patent Application No. 2005-228494. The entire disclosure of Japanese Patent Application No. 2005-228494 is hereby incorporated herein by reference.

BACKGROUND OF THE INVENTION

1. Field of the Invention

The present invention relates to a vehicle driving assist system configured to assist a driver with respect to the operation of a vehicle.

2. Background Information

One example of a vehicle driving assist system is disclosed in Japanese Laid-Open Patent Publication No. 2005-112243. In this publication, the vehicle driving assist system controls the actuation reaction forces exerted by the accelerator pedal and the brake pedal of a vehicle when those pedals are operated based on the risk potential in an area surrounding the host vehicle and increases the braking force exerted against the host vehicle when the possibility that the host vehicle will collide with a preceding obstacle is high. In particular, this system adds a pulsed reaction force to each of the reaction force of the accelerator pedal and the reaction force of the brake pedal when the possibility of collision shifts from a low state to a high state. The added reaction forces are set in accordance with the risk potential.

SUMMARY OF THE INVENTION

The vehicle driving assist system disclosed in Japanese Laid-Open Patent Publication No. 2005-112243 informs the driver that the possibility of the host vehicle colliding with the preceding obstacle is high by causing pulsed reaction forces to be exerted by the accelerator pedal and the brake pedal. In recent years, vehicles are provided with a variety of driving assist systems for controlling the behavior of the host vehicle. When two or more driving assist systems are used in a vehicle, it may be difficult for some drivers to keep track of the individual operating states of these vehicle driving assist systems. Consequently, it is beneficial for the driver to be informed of the operating states of the systems installed in the host vehicle in a manner that can be readily understood by the driver.

In accordance with one aspect of the present invention, a vehicle driving assist system is provided that basically comprises a traveling situation detecting section, a risk potential calculating section, an actuation reaction force control section, a vehicle behavior control section and a behavior control operating state notifying section. The traveling situation detecting section is configured to output a traveling situation detection result based on at least a following distance between a host vehicle and a preceding obstacle and a host vehicle speed of the host vehicle. The risk potential calculating section is configured to calculate a risk potential indicative of a degree of convergence between the host vehicle and the preceding obstacle based on the traveling situation detection result of the traveling situation detecting section. The actuation reaction force control section is configured to control an actuation reaction force exerted by an accelerator pedal of the host vehicle based on the risk potential calculated by the risk potential calculating section. The vehicle behavior control section is configured to control a behavior of the host vehicle. The behavior control operating state notifying section is configured to notify a driver in advance of a future operating state of the host vehicle behavior control section while the actuation reaction force control section is executing control of the actuation reaction force exerted by the accelerator pedal.

BRIEF DESCRIPTION OF THE DRAWINGS

Referring now to the attached drawings which form a part of this original disclosure:

FIG. 8 is a diagram illustrating a concept of determining the control state transition mode based on the operating state of the automatic braking control and the actuation amount of the accelerator pedal;

FIG. 9 is a pair of diagrams illustrating the concepts of the risk potential and automatic braking control of the host vehicle in which the driving assist system is installed;

FIG. 10 is a diagram illustrating a concept of determining the operating state of the automatic braking control;

FIG. 11 is a table illustrating the control state transition modes and the corresponding information presented to the driver in accordance with the first embodiment of the present invention;

FIG. 19 is a diagram illustrating a concept of determining the control state transition mode based on the operating state of the collision speed reduction control and the actuation amount of the accelerator pedal;

FIG. 20 is a table illustrating the control state transition modes and the corresponding information presented to the driver in accordance with the second embodiment of the present invention;

FIG. 27 is a table showing the control state transition modes and the corresponding information presented to the driver in accordance with the third embodiment of the present invention;

FIG. 28 are a plurality of time charts illustrating how the operating state of the lane departure prevention control, the accelerator pedal actuation reaction force, and the information presented to the driver change over time during Mode 21;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
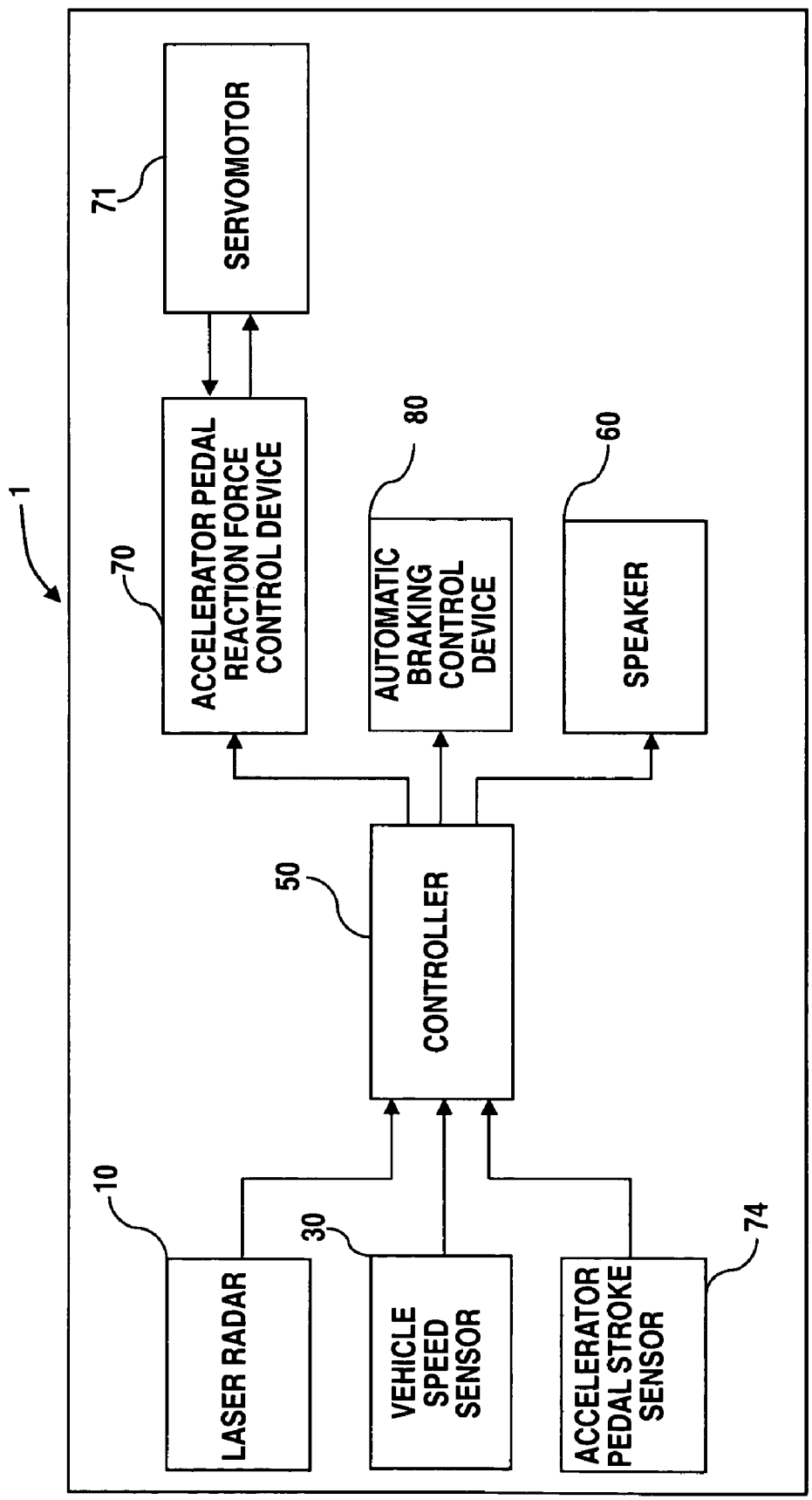
FIG. 1 is a block diagram of a vehicle driving assist system in accordance with a first embodiment of the present invention.
Figure 2:
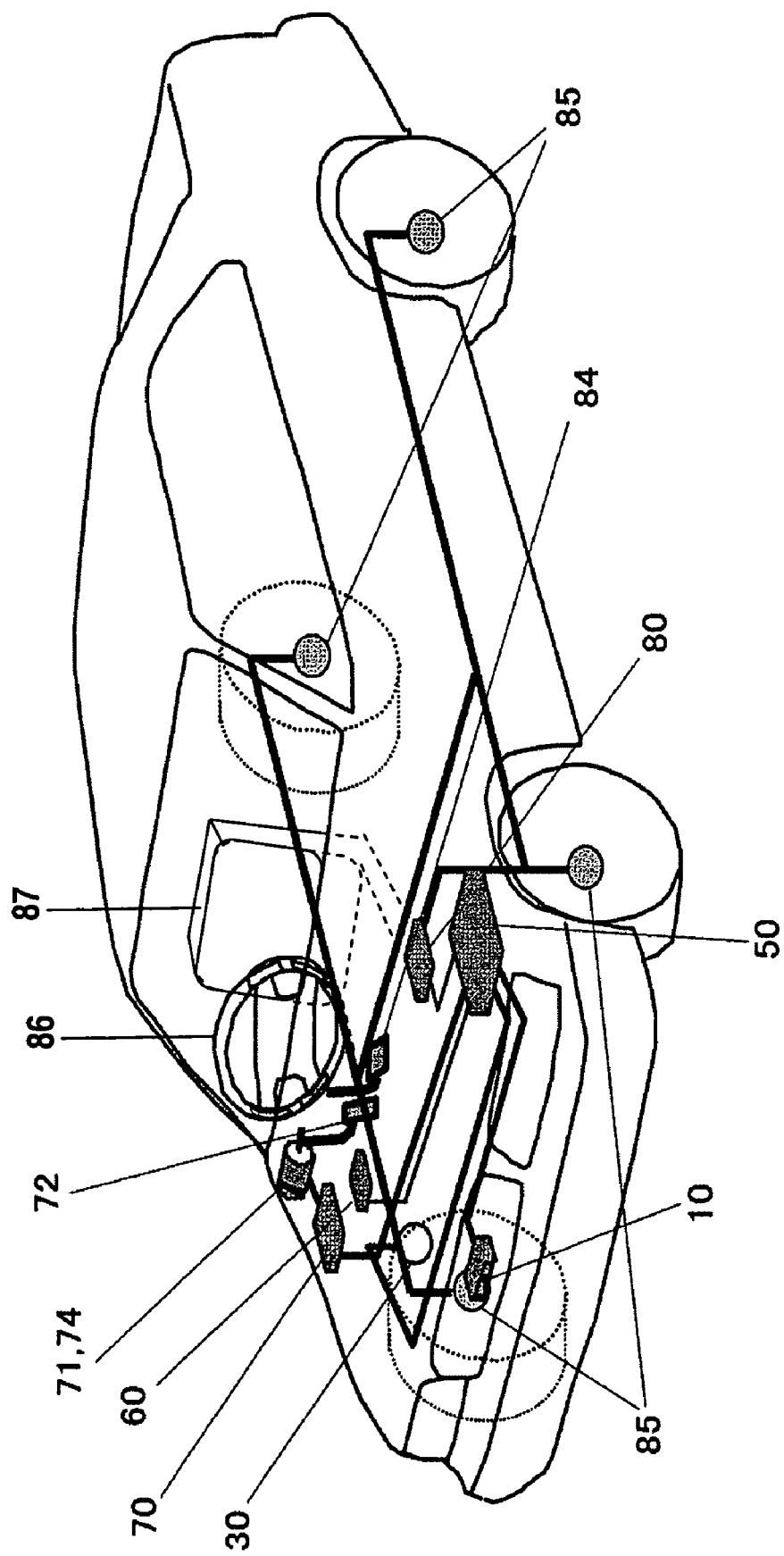
FIG. 2 is a schematic perspective view of a vehicle in which the vehicle driving assist system shown in FIG. 1 is installed in accordance with the first embodiment of the present invention.

Referring initially to FIG. 1, a vehicle driving assist system is illustrated in accordance with a first embodiment of the present invention. FIG. 1 is a block diagram of a vehicle driving assist system in accordance with the first embodiment of the present invention. FIG. 2 is a schematic perspective view of a vehicle (hereinafter also called "the host vehicle") in which the vehicle driving assist system shown in FIG. 1 is installed in accordance with the first embodiment of the present invention.

First, the main structures and features of the vehicle driving assist system will now be explained. A laser radar 10 is mounted to a front grill portion, a bumper portion, or the like of the host vehicle and serves to horizontally scan a region in front of the host vehicle with an infrared light pulse. The laser radar 10 then measures the reflected light resulting from the infrared light reflecting off of a plurality of reflecting objects located in front of the host vehicle (normally, the rear ends of preceding vehicles). By measuring the time required for the reflected light to arrive, the laser radar 10 detects the following distance and existence direction to a plurality of preceding vehicles. The detected following distances and existence directions are sent to a controller 50. In this embodiment, the existence directions of preceding objects can be expressed as a relative angle with respect to the host vehicle. The region in front of the host vehicle scanned by the laser radar 10 is, for example, ±6 degrees with respect to the front of the host vehicle and the system detects preceding objects existing within this angular range.

The vehicle speed sensor 30 is configured and arranged to detect the host vehicle speed of the host vehicle. The vehicle speed sensor 30 outputs a signal indicative of the host vehicle speed of the host vehicle to the controller 50. For example, the vehicle speed sensor 30 is configured and arranged to measure the rotational speed of the wheels and the rotational speed of the output side of the transmission, and then output the detected vehicle speed to the controller 50.

The controller 50 comprises a CPU and a ROM, a RAM, and other components peripheral to the CPU and serves to control the entire vehicle driving assist system 1. Based on the speed of the host vehicle received from the vehicle speed sensor 30 and the following distance information received from the laser radar 10, the controller 50 recognizes the preceding obstacle situation in the vicinity of the host vehicle, e.g., recognizes the traveling situation with respect to the preceding obstacles in terms of relative following distances and relative velocities with respect to the preceding obstacles. Based on the preceding obstacle situation, the controller 50 calculates risk potentials indicating the degree of convergence between the host vehicle and each preceding obstacle. The controller 50 also executes the control based on the risk potentials with respect to the preceding obstacles. In particular, the controller 50 then controls the actuation reaction force generated in (exerted by) an accelerator pedal 72 based on the risk potential described below. When the chances are high that the host vehicle and the preceding obstacle will collide with each other, the controller 50 executes automatic braking control to decelerate the host vehicle. In other words, the controller 50 of the present invention is configured to control the actuation reaction force exerted by the accelerator pedal 72 of the host vehicle based on a risk potential and to notify the driver of the future operating state of a behavior control of the host vehicle. Thus, the risk potential existing in the vicinity of the host vehicle can be conveyed to the driver through the actuation reaction force exerted by the accelerator pedal when the accelerator pedal is operated and, simultaneously, the operating state of the host vehicle behavior control can be conveyed to the driver in advance in situations where vehicle behavior control will be executed. As a result, the operating state of the host vehicle behavior control can be conveyed to the driver at an earlier stage.

Based on the reaction force control amount from the controller 50, an accelerator pedal reaction force control device 70 controls the torque generated by a servomotor 71 built into a linkage mechanism of the accelerator pedal 72. The servomotor 71 is configured and arranged to control the reaction force generated based on a command value from the accelerator pedal reaction force control device 70 and can freely control the actuation reaction force (accelerator pedal depression force) generated when the driver operates the accelerator pedal 72. The normal reaction force characteristic that exists when actuation reaction force control is not being executed is set such that the actuation reaction force increases proportionally to the increase in the depression amount of the accelerator pedal 72.

An accelerator pedal stroke sensor 74 is configured and arranged to detect the depression amount (actuation amount) of the accelerator pedal 72. The accelerator pedal stroke sensor 74 can be either a device that is configured and arranged to actually measure the pedal depression amount directly, or a device that is configured and arranged to indirectly measure the pedal depression amount, e.g., a throttle opening sensor. The accelerator pedal stroke sensor 74 is configured and arranged to output a signal indicative of the depression amount (actuation or operation amount) of the accelerator pedal 72. The depression amount of the accelerator pedal 72 is converted into a rotation angle of the servomotor 71 by a linkage mechanism. The accelerator pedal stroke sensor 74 outputs the detected accelerator pedal actuation amount to the controller 50.

An automatic deceleration control device 80 includes a driving force control device 81 configured to control a driving force exerted against the host vehicle, and a braking force control device 82 configured to control a braking force exerted against the host vehicle. The automatic deceleration control device 80 causes the host vehicle to decelerate by controlling the braking and driving forces acting on the host vehicle, thereby, alerting the driver and reducing the possibility of collision with a preceding obstacle. The driving force control device 81 is configured to control the engine (not shown in figures) so as to generate a driving force in accordance with actuation state of the accelerator pedal 72. It is also configured to change the driving force in response to an external command.

Figure 3:
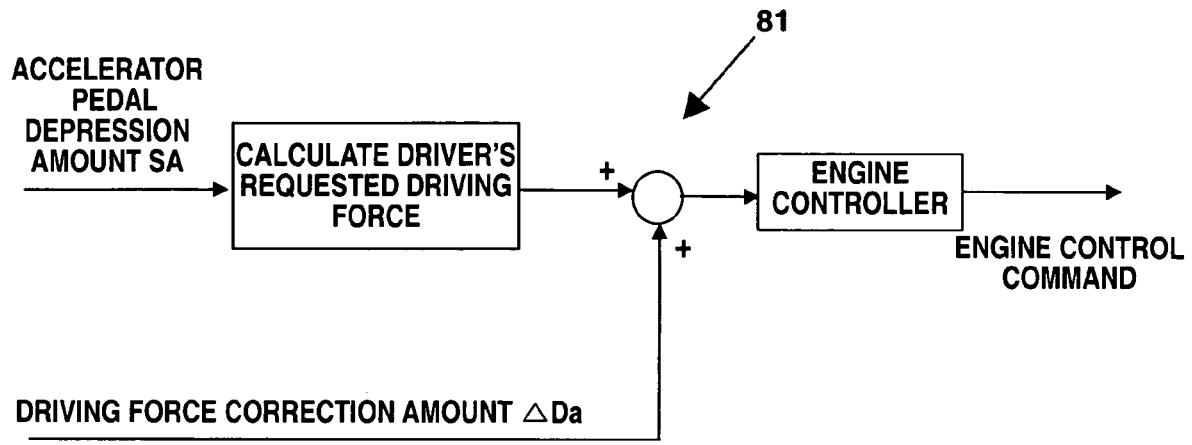
FIG. 3 is a diagram for explaining the general concept of the driving force control of the driving force control device in accordance with the first embodiment of the present invention.
Figure 4:
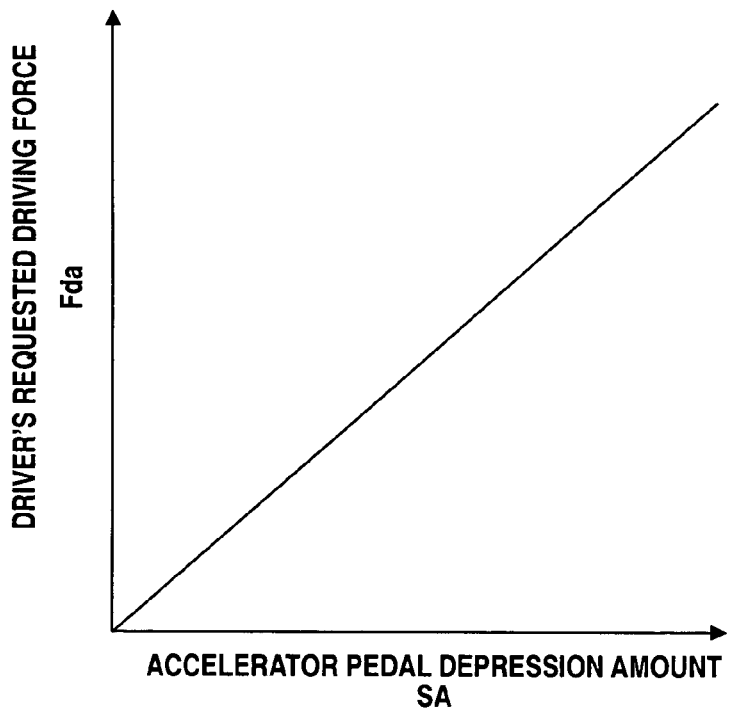
FIG. 4 is a plot of the requested driving force versus the accelerator pedal depression amount.

FIG. 3 shows the main features of a driving force control device 81. The driving force control device 81 uses a characteristic map like that shown in FIG. 4 to calculate the driver's requested driving force Fda based on the accelerator pedal actuation amount SA. The driving force control device 81 adds a driving force correction amount ΔDa (explained later) to the driver's requested driving force Fda so as to calculate a target driving force. The driving force control device 81 includes an engine controller that calculates an engine control command for the engine based on the target driving force.

Figure 5:
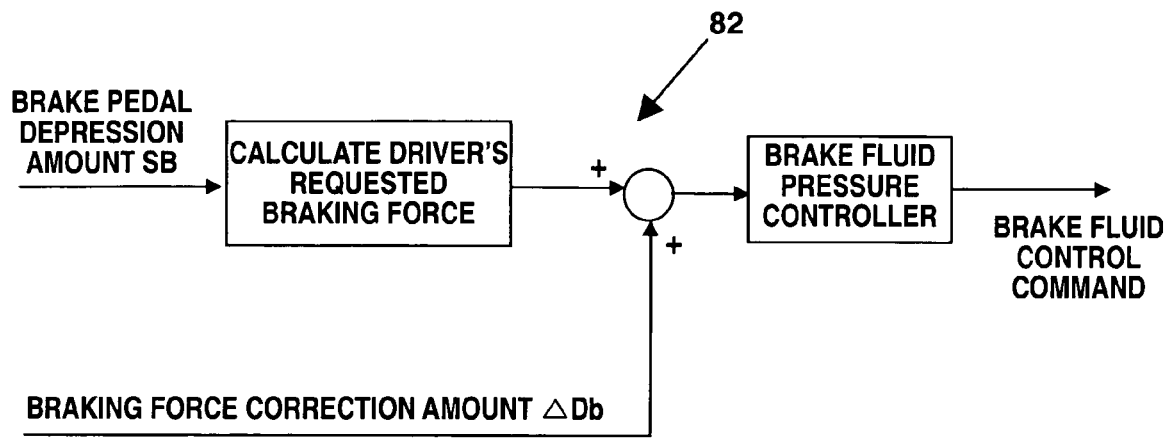
FIG. 5 is a diagram for explaining the general concept of the braking force control of the braking force control device in accordance with the first embodiment of the present invention.
Figure 6:
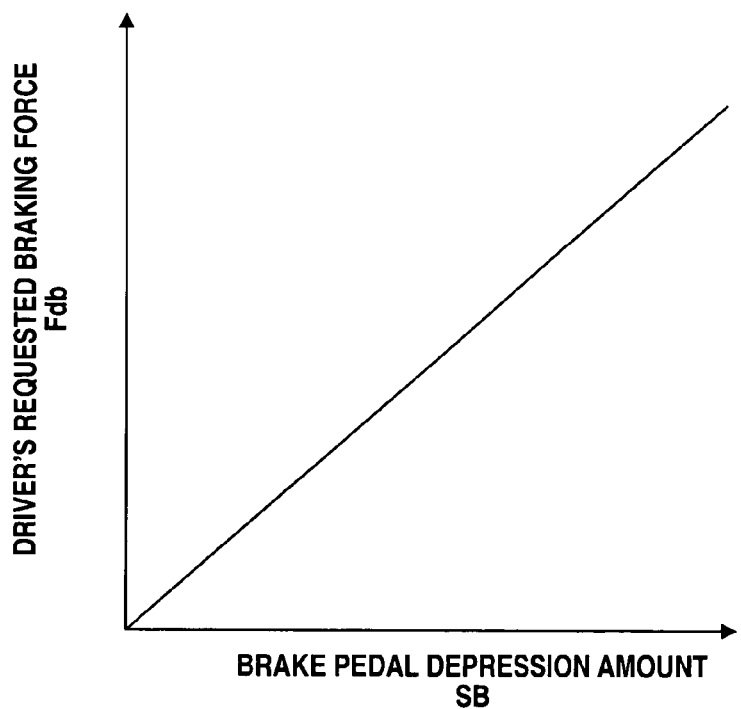
FIG. 6 is a plot of the requested braking force versus the brake pedal depression amount.

The braking force control device 82 is configured to output a brake fluid pressure command. In other words, the braking force control device 82 is configured to control the brake fluid pressure so as to generate a braking force in accordance with the actuation state of the brake pedal 84. It is also configured to change the brake fluid pressure in response to an external command. FIG. 5 shows the constituent features of the braking force control device 82. The braking force control device 82 uses a map like that shown in FIG. 6 to calculate the driver's requested braking force Fdb based on the brake pedal actuation amount SB. The braking force control device 82 adds a braking force correction amount ΔDb (explained later) to the driver's requested driving force Fdb so as to calculate a target braking force. The braking force control device 82 has a brake fluid pressure controller configured to output a brake fluid pressure command based on the target braking force. A brake device 85 is provided on each of the wheels of the host vehicle. The brake devices 85 operate in accordance with a control command issued from the brake fluid pressure controller.

A speaker 60 is configured to emit a beep sound or other alarm sound in response to a command from the controller 50 in order to alert the driver.

The operation of a vehicle driving assist system 1 in accordance with a first embodiment of the present invention will now be explained. First, a general summary of the operation is provided.

The controller 50 controls the actuation reaction force generated in the accelerator pedal 72 based on the risk potential RP in the vicinity of the host vehicle and controls the braking and driving forces acting on the host vehicle so as to decelerate the host vehicle when the chances of collision between the host vehicle and a preceding obstacle are high. Thus, when the driving assist system 1 is configured to concurrently execute both an accelerator pedal actuation reaction force control and an automatic braking control (deceleration force control), it may be very difficult for the driver to know when execution of each of the controls will be commenced and what is the current operating state of each of the controls.

For example, assume the driver is depressing the accelerator pedal 72 and an actuation reaction force based on a risk potential RP is being generated. Under these conditions, the automatic braking control will start and the host vehicle will be decelerated if the chances (likelihood) of collision between the host vehicle and the preceding obstacle become high. The driver will not feel that anything is odd about the host vehicle so long as the accelerator pedal 72 remains depressed because a driving force will continue to be generated in accordance with the depression of the accelerator pedal 72. However, if the driver releases the accelerator pedal 72, the host vehicle will be heavily braked due to the automatic braking control. If the driver cannot grasp the change in behavior of the host vehicle immediately, the automatic braking control could become a nuisance to the driver even though it was executed in order to reduce the possibility of collision with a preceding obstacle.

Therefore, in the first embodiment, the actuation reaction force exerted by the accelerator pedal 72 and an alarm sound emitted from the speaker 60 are used to inform the driver in advance regarding what kind of automatic braking control will be executed, i.e., what the execution status of the automatic deceleration control device 80 will be in the future.

Figure 7:
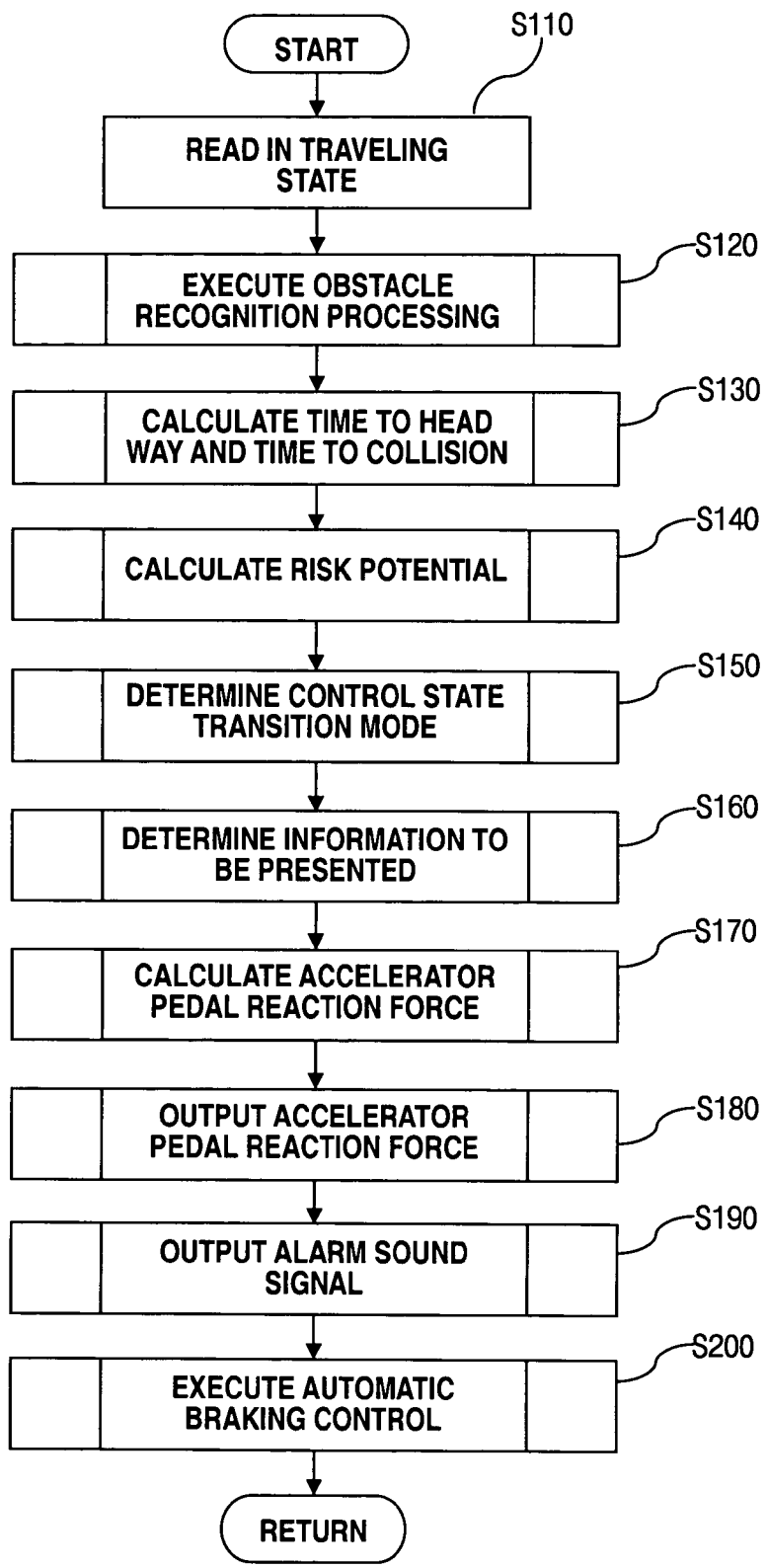
FIG. 7 is a flowchart showing the processing steps of a driving assistance control program in accordance with the first embodiment of the present invention.

The operation of the vehicle driving assist system 1 in accordance with the first embodiment will now be explained in more detail with reference to FIG. 7. FIG. 7 is a flowchart showing the processing steps of a driving assistance control program executed by the controller 50. This control loop is executed continuously once per prescribed time period, e.g., every 50 msec.

In step S110, the controller 50 reads in the traveling situation. The traveling situation mentioned here constitutes information related to the traveling circumstances of the host vehicle, including but not limited to, information regarding preceding obstacles in front of the host vehicle. Thus, the controller 50 reads in the following distance D and existence direction to the preceding obstacle detected by the laser radar 10 and the host vehicle traveling speed V of the host vehicle detected by the vehicle speed sensor 30. The controller 50 also reads in the accelerator pedal actuation amount SA detected by the accelerator pedal stroke sensor 74.

In step S120, the controller 50 recognizes the situation regarding obstacles in front of the host vehicle based on the traveling situation data read in step S110. More specifically, the controller 50 recognizes the current relative position, movement direction, and movement velocity (relative velocity Vr) of the preceding obstacle with respect to the host vehicle based on the current traveling situation data obtained in step S110 and based on the relative position, movement direction, and movement velocity of the preceding object (obstacle) with respect to the host vehicle that were detected during or prior to the previous control cycle and stored in the memory of the controller 50. The controller 50 then recognizes the manner in which the preceding obstacle is disposed in front of the host vehicle and the manner in which the preceding obstacle is moving relative to the movement of the host vehicle.

In step S130, the controller 50 calculates a time to collision TTC and a time to head way (following time) THW between the host vehicle and the preceding obstacle.

The time to collision TTC is a physical quantity indicating the current degree of convergence of the host vehicle with respect to the preceding obstacle, which is, for example, a preceding vehicle. The time to collision TTC is a value that indicates how many seconds before the following distance D becomes zero and the host vehicle and preceding vehicle contact each other assuming that the current traveling circumstances continue, i.e., assuming that the host vehicle speed V, the preceding vehicle speed Vf, and the relative vehicle speed Vr remain constant. The relative velocity Vr equals the host vehicle speed V minus the preceding vehicle speed Vf (Vr=V−Vf). The time to collision TTC is found using the Equation 1 shown below.

$$TTC=D/Vr \tag{Equation 1}$$

As the time to collision TTC becomes smaller, the contact with the preceding vehicle becomes more eminent and the degree of convergence with respect to the preceding vehicle becomes larger. For example, it is known that when approaching a preceding vehicle, most drivers start taking action to decelerate before the time to collision TTC reaches 4 seconds or less.

The time to head way THW is a physical quantity that is relevant when the host vehicle is following a preceding vehicle and indicates the degree of influence changes in the speed of the preceding vehicle (which are assumed to occur in the future) will have on the time to collision TTC, i.e., the degree of influence under the assumption that the relative velocity Vr will change. The time to head way THW is found using the Equation 2 shown below.

$$THW=D/V \tag{Equation 2}$$

The time to head way THW equals the following distance divided by the host vehicle speed and thus indicates the amount of time required for the host vehicle to move from its current position to the current position of the preceding vehicle. As the time to head way THW becomes larger, the smaller amount influence is that the surroundings have on the degree of convergence. In other words, when the time to head way THW is large, any future change in the speed of the preceding vehicle will not have a large effect on the degree of convergence between the host vehicle and the preceding vehicle and, thus, the time to collision TTC will not change very much. When the host vehicle is following a preceding vehicle and the host vehicle speed V equals the preceding vehicle speed Vf, then the preceding vehicle speed Vf can be used in Equation 2 instead of the host vehicle speed V to calculate the time to head way THW.

In step S140, the controller 50 calculates a risk potential RP indicating the degree of convergence between the host vehicle and the preceding obstacle, e.g., preceding vehicle, in front of the host vehicle. The term "risk potential" refers to the degree of risk or possibility of danger. In this embodiment, the risk potential is contrived to increase as the host vehicle and a preceding obstacle existing in the vicinity of the host vehicle approaches each other. Thus, the risk potential is a physical quantity that expresses how close the host vehicle and the preceding obstacle are to each other, i.e., the degree to which the host vehicle and the preceding obstacle have drawn near to each other (degree of convergence).

The risk potential RP is calculated with the Equation 3 below using the time to collision TTC and time to head way THW calculated in step S130.

$$RP=A/THW+B/TTC \tag{Equation 3}$$

In the Equation 3, the terms A and B are constants serving to appropriately weight the inverse of the time to head way THW and the inverse of the time to collision TTC. The constants A and B are set in advance to appropriate values, e.g., A=1 and B=8 (A<B).

In step S150, the controller 50 determines a control state transition mode indicating a change in the control state of the vehicle driving assist system 1. More specifically, as shown in FIG. 8, the controller 50 determines which of the control state transition modes 1 to 7 described below is in effect based on the operating state of the automatic braking control and the actuation state of the accelerator pedal 72.

Mode 1 of the vehicle driving assist system 1 exists when the accelerator pedal 72 is being actuated (depressed) and the automatic braking control is going to shift from a low operating state (light braking) to a high operating state (hard braking). Mode 2 of the vehicle driving assist system 1 exists when the accelerator pedal 72 is being actuated (depressed) and the automatic braking control is going to shift from a high operating state (hard braking) to a low operating state (light braking). Mode 3 of the vehicle driving assist system 1 exists when the automatic braking control is in a high operating state and the accelerator pedal 72 is beginning to be actuated. Mode 4 of the vehicle driving assist system 1 exists when the automatic braking control is in a high operating state and the accelerator pedal 72 is being released. Mode 5 of the vehicle driving assist system 1 exists when the accelerator pedal 72 not is being actuated and the automatic braking control is going to shift from a low operating state to a high operating state. Mode 6 of the vehicle driving assist system 1 exists when the accelerator pedal 72 is not being actuated and the automatic braking control is going to shift from a high operating state to a low operating state. Otherwise, Mode 7 of the vehicle driving assist system 1 exists when the automatic braking control is in a low operating state and the accelerator pedal 72 is turning either ON or OFF.

The actuation state of the accelerator pedal 72 is determined based on the detection value from the accelerator pedal stroke sensor 74 read in step S110. The accelerator pedal 72 is determined to be actuated (accelerator pedal ON) when the accelerator pedal actuation amount SA is larger than 0 and not to be actuated (accelerator pedal OFF) when SA equals 0.

The operating state of the automatic braking control is determined to be "high" when the deceleration that the host vehicle experiences due to the automatic braking control is equal to or higher than a prescribed value G1. Meanwhile, the operating state of the automatic braking control is determined to be "low" when the deceleration that the host vehicle experiences due to the automatic braking control is lower than the prescribed value G1. The prescribed deceleration value G1 is set to a value (e.g., 1 m/S$^2$) corresponding to a deceleration that would occur of the automatic braking control induced heavy braking when the driver released the accelerator pedal 72.

In order to give the driver advanced notice that the automatic braking control will shift from a high operating state to a low operating state or from a low operating state to a high operating state, the controller 50 calculates a control transition time $t_{abs}$ indicating the amount of time required from the current time until the deceleration of the host vehicle caused by the automatic braking control reaches the prescribed value G1.

Referring now to FIG. 9, two cases are schematically modeled to explain method of calculating the target automatic braking control and a risk potential RPvb. Consider a model in which it is assumed that an imaginary elastic body VB is provided on the front of the host vehicle in which the assist system 1 is installed, as shown in diagram (a) of FIG. 9. The imaginary elastic body VB touches against the preceding vehicle 200 and is compressed, thereby generating a pseudo traveling resistance against the movement of the host vehicle. The automatic deceleration control device 80 calculates the deceleration to be targeted by the automatic braking control based on this model. The spring force that results when the imaginary elastic body VB is compressed against the preceding vehicle, as shown in diagram (b) of FIG. 9, is defined to be a risk potential RPvb indicating the chances of contact between the host vehicle and the preceding vehicle. The automatic deceleration control device 80 calculates the risk potential RPvb based on the time to head way THW and the time to collision TTC between the host vehicle and the preceding obstacle and executes braking control such that as the risk potential RPvb becomes larger, the deceleration the host vehicle is undergoing becomes larger.

FIG. 10 shows the relationship between the time to collision TTC, the time to head way THW, and the deceleration in the automatic braking control. In FIG. 10, the time to head way THW between the host vehicle and the preceding obstacle is indicated on the horizontal axis and the inverse TTCi of the time to collision TTC is indicated on the vertical axis. The automatic deceleration control device 80 is configured such that the deceleration it generates increases as the time to head way THW and the following distance D decrease and as the inverse TTCi of the time to collision and the velocity of the host vehicle with respect to the preceding obstacle increase. The hatched (shaded) area where the time to head way THW is smaller than a prescribed value a and/or the inverse TTCi of the time to collision is larger than a prescribed value b corresponds to the high operating state of the automatic braking control. Therefore, the deceleration caused by the automatic braking control equals the prescribed value G1 when the time to head way THW equals a or the inverse TTCi equals b.

Therefore, first, the following distance D between the host vehicle and the preceding obstacle, the relative velocity Vr between the host vehicle and the preceding obstacle, and the host vehicle speed Vh are assumed to remain constant and are used to calculate a time tthw until the time to head way THW reaches the prescribed value a and the time tttci until the inverse TTCi of the time to collision reaches the prescribed value b. The prescribed value a is expressed according to Equation 4 below using the time tthw.

$$a=(D-Vr \times tthw)/V \qquad \text{(Equation 4)}$$

Thus, the time tthw can be estimated using Equation 5 below.

$$tthw=(D-a \times Vr)/Vr \qquad \text{(Equation 5)}$$

The prescribed value b is expressed according to Equation 6 below using the time tttci.

$$b=Vr/(D-Vr \times tttci) \qquad \text{(Equation 6)}$$

Thus, the time tttci can be estimated using Equation 7 below.

$$tttci=(bD-Vr)/bVr \qquad \text{(Equation 7)}$$

The time to control transition $t_{abs}$ is calculated with Equation 8 below.

$$tabs=\text{MIN}(tthw, tttci) \qquad \text{(Equation 8)}$$

In short, the smaller of the times tthw and tttci calculated with Equations 5 and 7 is set as the time to control transition tabs. In the first embodiment, the operating state of the automatic braking control is predicted to change in the future when the time to control transition $t_{abs}$ reaches a prescribed value, e.g., 1 sec. The information to be provided to the driver in order to notify the driver that the operating state will change is then determined in step S160.

After the time to control transition $t_{abs}$ has reached the prescribed value, the time to control transition $t_{abs}$ will not changed if the following distance D, relative velocity Vr, and vehicle speed V do not change. Thus, the same information will be repeatedly conveyed for notifying the driver that the operating state will change. Therefore, in order to prevent control hunting from occurring, the prescribed value a of the time to head way and the prescribed value b of the time to collision TTCi are changed to a+a1 and b+b1, respectively, when the time to control transition $t_{abs}$ reaches the prescribed value. The values of a1 and b1 are, for example, 0.2 and 0.05, respectively (a1=0.2 and b1=0.05). By changing the prescribed values a and b, a stable notification is accomplished. After a prescribed amount of time has elapsed or the following distance, relative velocity Vr, or vehicle speed has changed, the prescribed values a and b are returned to their original values.

The absolute value of or a differential value of the time to control transition $t_{abs}$ can be used when determining whether or not to notify the driver of a change in the operating state of the automatic braking control. For example, the system 1 can be configured such that when the automatic braking control will shift from a low operating state to a high operating state, the driver is notified of the pending change in the operating state of the automatic braking control when the absolute value of the time to control transition $t_{abs}$ is equal to or above a prescribed value and the differential value of the same is, for example, larger than −0.5. In this way, the occurrence of incorrect notification is reduced.

In step S160, the controller 50 determines the information that will be presented to the driver based on the time to control transition $t_{abs}$ and the control state transition mode determined in step S150. FIG. 11 is a table showing the information presented to the driver for each control state transition mode. When the system 1 is in Mode 1, the controller 50 notifies the driver that the host vehicle behavior will change due to the automatic braking system shifting to a high operating state by generating a pulsed supplemental reaction force (i.e., a series of single bursts supplemental reaction force) in the accelerator pedal 72 and issuing an alarm sound from the speaker 60 before the transition to the high operating state occurs, i.e., when the time to control transition $t_{abs}$ has fallen to 1 sec. After the transition to the high operating state has actually occurred, the system 1 generates a vibration in the accelerator pedal 72. Alternatively, other notifications can be used. For example, the host vehicle of FIG. 2 can be provided with a vibrating steering wheel 86 and/or a vibrating seat 87 that are configured and arranged to be vibrated by the controller 50 so as to notifies the driver that the host vehicle behavior will change due the automatic deceleration control device 80 (host vehicle behavior control section) while an actuation reaction force control section the controller 50 is executing control of an actuation reaction force exerted by the accelerator pedal 72.

When the system 1 is in Mode 2, the controller 50 notifies the driver that the host vehicle behavior will change due to the automatic braking system shifting to a low operating state by ending the vibration generated in the accelerator pedal 72 before the transition to the low operating state occurs, i.e., when the time to control transition $t_{abs}$ has risen to 1 sec. When the system 1 is in Mode 3, the controller 50 increases the actuation reaction force of the accelerator pedal 72 for a prescribed amount of time to make the driver aware that the automatic braking control is in a high operating state. The amount of time that the actuation reaction force is increased is set to be significantly longer than the time during which the pulsed supplemental reaction force is generated in Mode 1. Also, a vibration is generated in the accelerator pedal 72 during Mode 3. When the system 1 is in Mode 4, no information is presented to the driver because the driver has already been informed that the automatic braking control is in the high operating state (informed when the system was in Mode 3).

When the system 1 is in Mode 5, the controller 50 notifies the driver that the host vehicle behavior will change due to the automatic braking system shifting to a high operating state by issuing an alarm sound from the speaker 60 before the transition to the high operating state occurs, i.e., when the time to control transition $t_{abs}$ has fallen to 1 sec. No information is presented in Modes 6 and 7.

Figure 12:
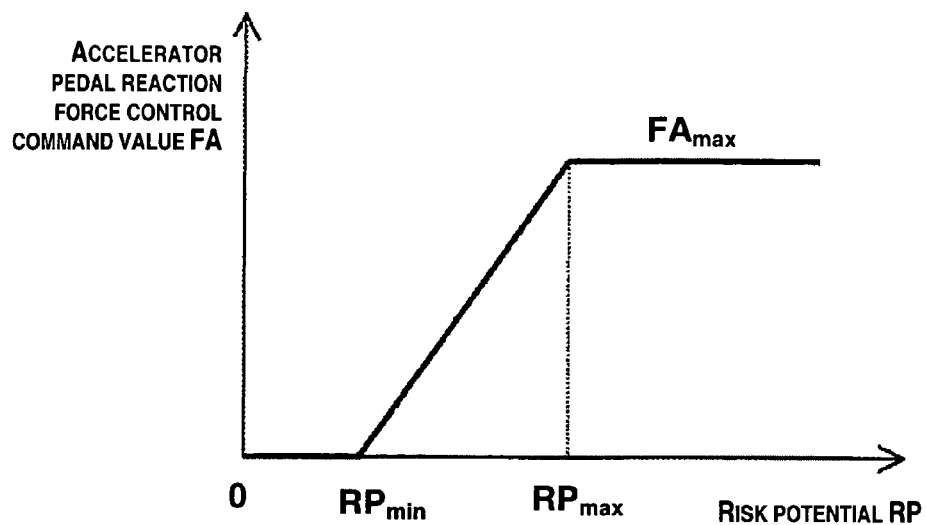
FIG. 12 is a plot of the accelerator pedal reaction force control command value versus the risk potential.

In step S170, the controller 50 calculates an accelerator pedal reaction force control command value FA that serves as a control amount for the actuation reaction force to be exerted by (generated in) the accelerator pedal 72 based on the risk potential RP calculated in step S140 and the information determined in step S160. FIG. 12 is a plot of the accelerator pedal reaction force control command value FA versus the risk potential RP. The accelerator pedal reaction force control command value FA is gradually increased as the risk potential RP increases and is fixed at a maximum value FAmax when the risk potential RP is equal to or larger than a maximum value RPmax.

When it determines in step S160 that a pulsed supplemental reaction force will be generated in (exerted by) the accelerator pedal 72, the controller 50 adds a prescribed supplemental reaction force ΔFp to be generated for only a short period of time to the reaction force control value FA. The supplemental reaction force is generated, for example, two times in succession. When it determines that a vibration will be generated in the accelerator pedal 72, the controller 50 sets a prescribed pulse width and period at which the vibration will be generated. The vibration can be generated by controlling the servomotor 71. Alternatively, a separately provided oscillator or the like can also be used to generate the vibration.

When it determines that the control state is in Mode 3 and that the actuation reaction force will be increased when the driver starts actuating the accelerator pedal 72, the controller 50 adds a prescribed increase amount ΔFm to the accelerator pedal reaction force control command value FA for a prescribed amount of time ΔTm after the driver starts depressing the accelerator pedal 72. The amount of time ΔTm that the increase amount ΔFm is continuously added is set to be significantly longer than the amount of time during which the pulsed supplemental reaction force ΔFp is generated.

In step S180, the controller 50 sends the accelerator pedal reaction force control command value FA calculated in step S170 and the supplemental reaction force ΔFp or other quantity for presenting information to the driver to the accelerator pedal reaction force control device 70. The accelerator pedal reaction force control device 70 controls the actuation reaction force exerted by the accelerator pedal 72 based on the command value received from the controller 50. More specifically, the accelerator pedal reaction force control device 70 causes the actuator pedal 72 to exert a reaction force equal to the value obtained by adding the supplemental reaction force ΔFp, the increase amount ΔFm or the vibration amount or other supplemental quantity to the reaction force control command value FA (which is obtained using the normal reaction force characteristic based on the accelerator pedal actuation amount SA).

In step S190, if it has determined in step S160 that an alarm sound will be emitted, the controller 50 causes the speaker 60 to emit a beep sound in single bursts at timings synchronized with the generation of the supplemental reaction force ΔFp in the accelerator pedal 72.

In step S200, the controller 50 instructs the automatic deceleration control device 80 to execute automatic braking control such that the host vehicle undergoes the deceleration calculated based on the inverse TTCi of the time to collision and the time to head way THW between the host vehicle and the preceding obstacle. More specifically, the automatic deceleration control device 80 calculates the driving force correction amount ΔDa and the braking force correction amount ΔDb required for generating the calculated deceleration. Then, the driving force control device 81 executes control to reduce the driving force based on the requested driving force Fda indicated by the accelerator pedal actuation amount SA and the driving force correction amount ΔDa. Meanwhile, the braking force control device 82 executes control to increase the braking force based on the requested braking force Fdb indicated by the brake pedal actuation amount SB and the braking force correction amount ΔDb. After the command values are sent, the current control loop ends.

The operational effects of the first embodiment will now be explained with reference to the drawings. The time charts (a) to (d) of FIGS. 13 to 16 show how the operating state of the automatic braking control, the accelerator pedal actuation reaction force, and the information presented to the driver change over time during each of Modes 1, 2, 3 and 5, respectively.

Figure 13:
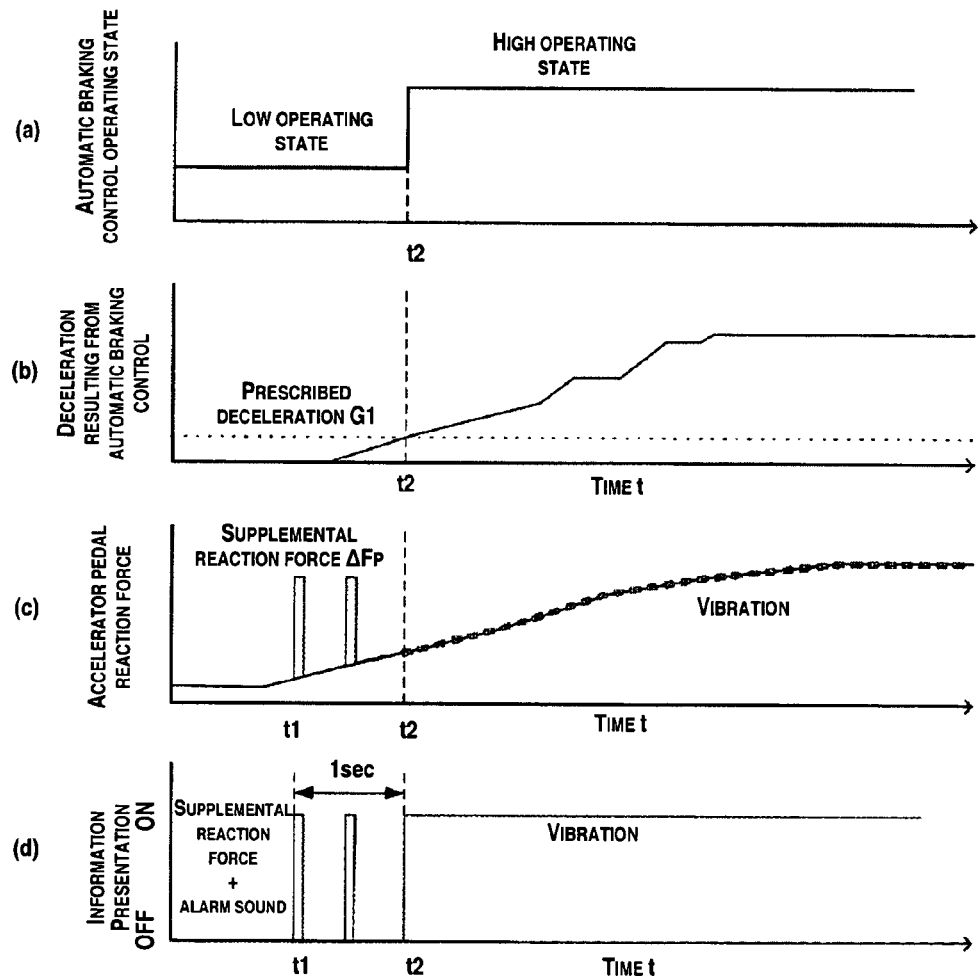
FIG. 13 are a plurality of time charts illustrating how the operating state of the automatic braking control, the deceleration resulting from the automatic braking control, the accelerator pedal actuation reaction force, and the information presented to the driver change over time during Mode 1.

As shown in time charts (a) to (d) of FIG. 13, when the system 1 is in Mode 1, the accelerator pedal 72 is made to exert a reaction force equal to the accelerator pedal reaction force control command value FA corresponding to the risk potential RP and the automatic braking control begins to decelerate the host vehicle when the chances of contact between the host vehicle and the preceding obstacle become high. At the time t2 when the deceleration caused by the automatic braking control has risen to the prescribed value G1, the automatic braking control shifts from the low operating state to the high operating state. The controller 50 consecutively computes the time to control transition $t_{abs}$, i.e., the amount of time until the deceleration increases to the prescribed value G1. At the time t1 when the time to control transition $t_{abs}$ reaches 1 sec, the controller 50 executes control that causes the accelerator pedal 72 to exert a pulsed supplemental reaction force ΔFp two times in succession and causes the speaker 60 to emit a single-burst beep sound two times in succession. After the time t2 when the automatic braking control shifts to the high operating state, the accelerator pedal 72 exerts an actuation reaction force in accordance with the risk potential RP and also vibrates continuously. The automatic braking control is executed at a deceleration rate corresponding to the time to head way THW and the inverse TTCi.

Figure 14:
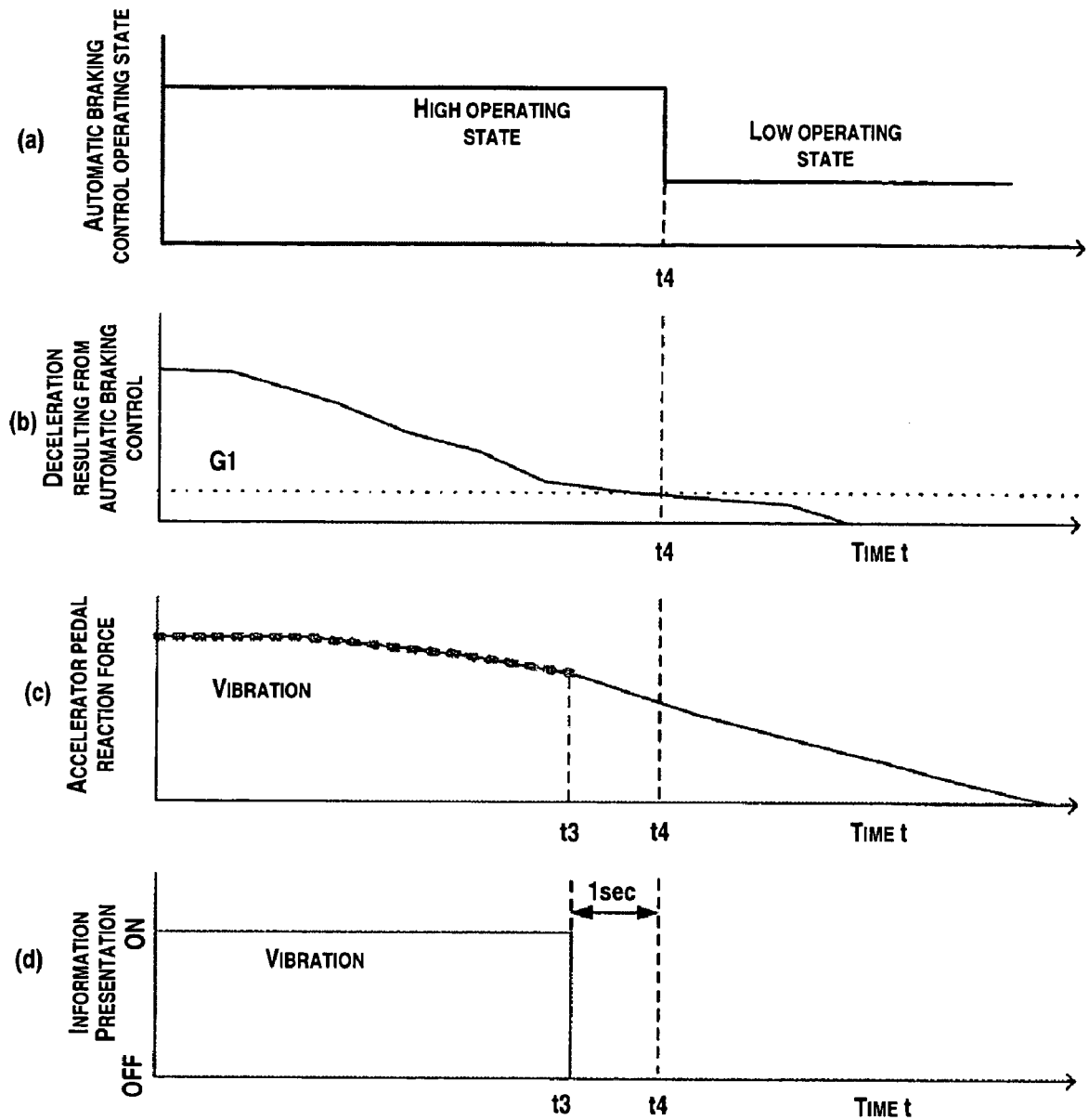
FIG. 14 are a plurality of time charts illustrating how the operating state of the automatic braking control, the deceleration resulting from the automatic braking control, the accelerator pedal actuation reaction force, and the information presented to the driver change over time during Mode 2.

As shown in time charts (a) to (d) of FIG. 14, when the system 1 is in Mode 2, automatic braking control is executed in accordance with the chances of contact and the accelerator pedal 72 is controlled so as to both vibrate and exert a reaction force equal to an accelerator pedal reaction force control command value FA corresponding to the risk potential RP. At the time t4 when the deceleration caused by the automatic braking control has fallen to the prescribed value G1, the automatic braking control shifts from the high operating state to the low operating state. The controller 50 computes the time $t_{abs}$ until the deceleration decreases to the prescribed value G1 (time to control transition) in a consecutive fashion. At the time t3 when the time to control transition $t_{abs}$ reaches 1 sec, the controller 50 executes control that causes the accelerator pedal 72 to stop vibrating.

Figure 15:
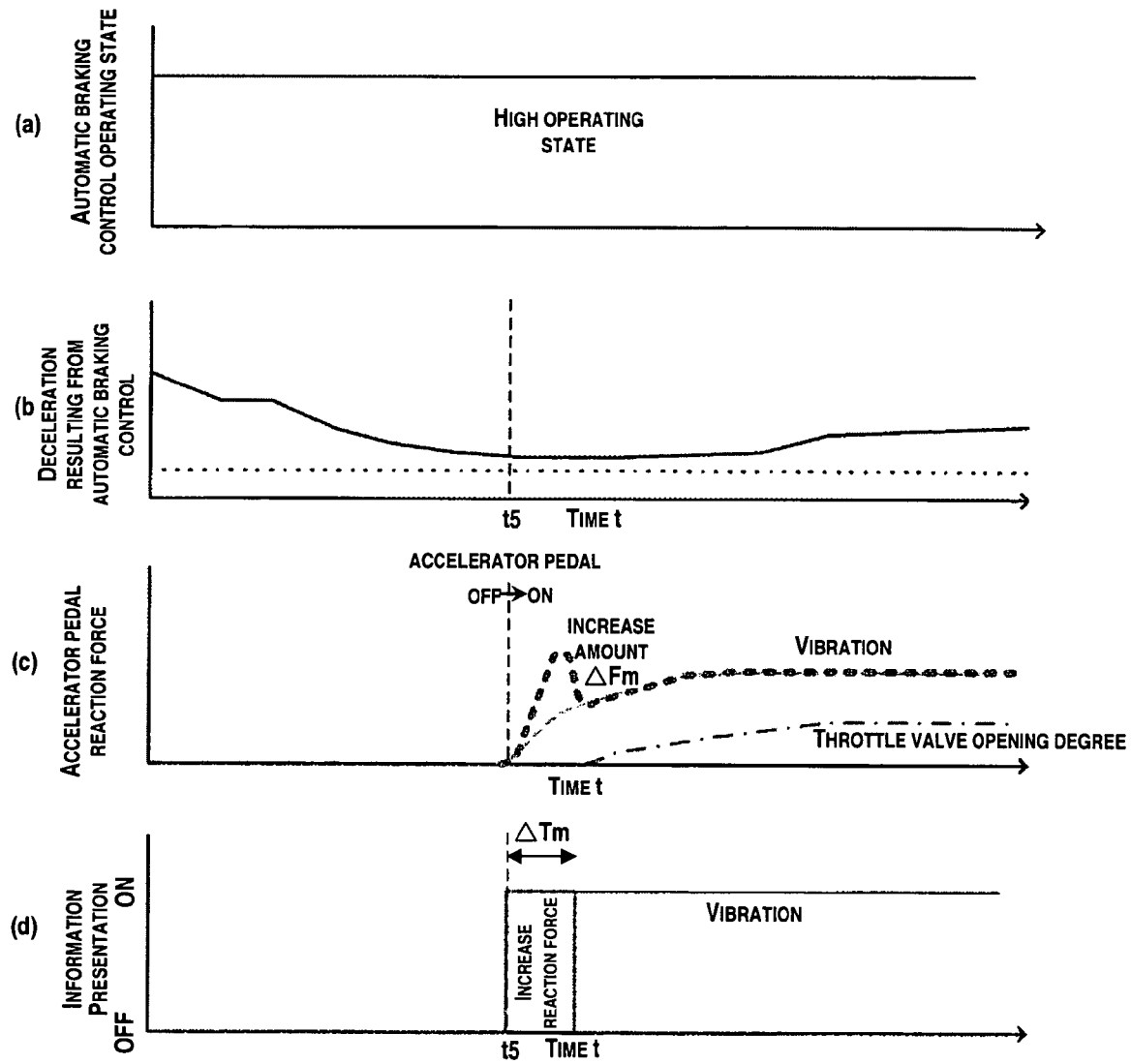
FIG. 15 are a plurality of time charts illustrating how the operating state of the automatic braking control, the deceleration resulting from the automatic braking control, the accelerator pedal actuation reaction force, and the information presented to the driver change over time during Mode 3.

As shown in time charts (a) to (d) of FIG. 15, when the system 1 is in Mode 3, the automatic braking control stays in the high operating state. When the accelerator pedal 72 is depressed at the time t5, the accelerator pedal 72 is controlled so as to exert a reaction force equal to the sum of the accelerator pedal reaction force control command value FA corresponding to the risk potential RP and an increase amount ΔFm for a prescribed amount of time ΔTm. After the time ΔTm has elapsed, the increase amount ΔFm is removed and only the command value FA is exerted. The accelerator pedal 72 also vibrates during Mode 3. Normally, the throttle valve opening is set proportionally to the actuation amount SA of the accelerator pedal 72. Thus, the addition of the increase amount ΔFm causes the accelerator pedal actuation reaction force to increase, making the accelerator pedal 72 initially difficult to depress. Then, as indicated with the single-dot chain line in time chart (c) of FIG. 15, the throttle valve opening degree increases gradually. As a result, when the automatic braking control is already in the high operating state, the system suppresses the driver's ability to depress the accelerator pedal 72 and increase the driving force.

Figure 16:
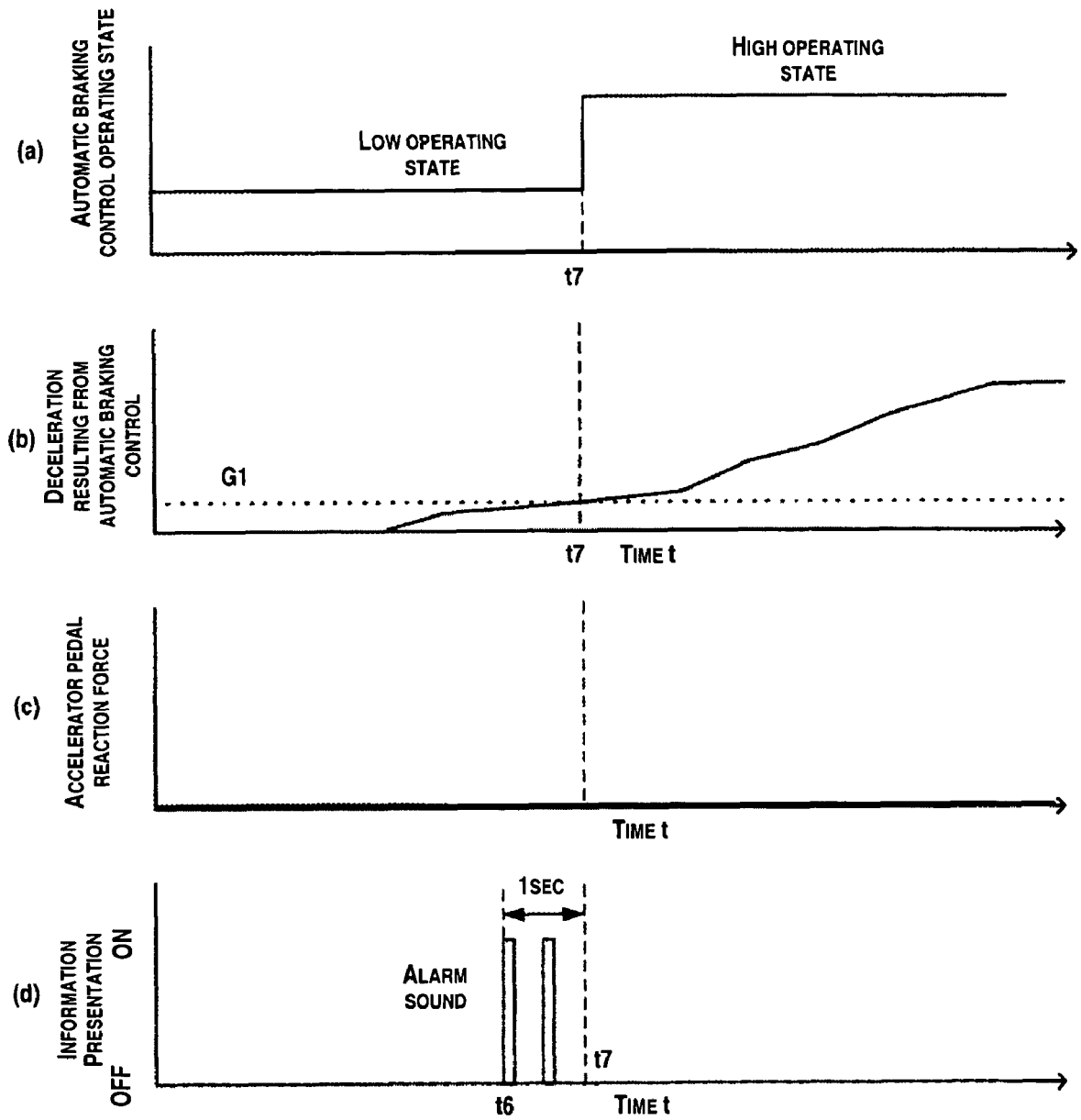
FIG. 16 are a plurality of time charts illustrating how the operating state of the automatic braking control, the deceleration resulting from the automatic braking control, the accelerator pedal actuation reaction force, and the information presented to the driver change over time during Mode 5.

As shown in time charts (a) to (d) of FIG. 16, when the system 1 is in Mode 5, the automatic braking control starts to decelerate the host vehicle when the chances of contact between the host vehicle and the preceding obstacle become high. At the time t7 when the deceleration caused by the automatic braking control has fallen to the prescribed value G1, the automatic braking control shifts from the low operating state to the high operating state. The controller 50 executes control that causes the speaker 60 to emit a single-burst beep sound two times in succession at the time t6 when the time to control transition $t_{abs}$ reaches 1 sec. Since the accelerator pedal 72 is not being operated, neither a supplemental reaction force ΔFb nor a vibration is generated.

The first embodiment described heretofore can thus provide the following operational effects.

The vehicle driving assist system 1 is configured to detect at least the distance D between the host vehicle in which the system 1 is installed and a preceding obstacle existing in front of the host vehicle and the speed Vh of the host vehicle in which the system 1 is installed. The system 1 then calculates a risk potential RP indicating the degree of convergence between the host vehicle and the preceding obstacle based on the detected values and controls the actuation reaction force of generated in (exerted by) the accelerator pedal 72 based on the risk potential RP. The vehicle driving assist system 1 is also equipped with a system for controlling a behavior of the host vehicle and is configured to notify the driver in advance of the future operating state of the host vehicle behavior control system while the accelerator pedal reaction force control is being executed. Thus, the risk potential in the vicinity of the host vehicle can be conveyed to the driver in an intuitive manner by an actuation reaction force generated when the driver operates the accelerator pedal 72 and the operating state of another vehicle behavior control can be conveyed to the driver in advance when another vehicle behavior control will be executed. Since the driver can be informed in advance regarding how the operating state of the host vehicle behavior control will change, the driver can perform appropriate driving operations to accommodate the change in the operating state.

In addition to providing advanced notice regarding the future operating state of the host vehicle behavior control, the vehicle driving assist system 1 is also configured to urge the driver to perform a recommended driving operation suited to the operating state of the host vehicle behavior control. More specifically, by causing the accelerator pedal 72 to exert a supplemental reaction force ΔFp (urging stimulus) before the deceleration caused by the automatic braking control reaches or exceeds the prescribed value G1 as shown in time charts (c) of FIG. 13, the system encourages the driver to switch from operating the accelerator pedal to operating the brake pedal in order to accommodate the automatic braking control that is about to commence. Thus, the "recommended driving operation" is the switching from accelerator pedal operation to brake pedal operation. By nudging the driver toward a recommended driving operation in addition to notifying the driver of that the operating state of the control will change, the driver can be urged to adopt an appropriate driving operation at an earlier stage.

The vehicle driving assist system 1 is provided with an automatic braking control (braking force and driving force control) configured to control the braking force and driving force acting on the host vehicle based on the risk potential RP. This automatic braking control is an example of a vehicle behavior control. The risk potential RP used here is a risk potential RPvb indicating the chances of contact between the host vehicle and a preceding obstacle. Thus, in addition to notifying the driver of the risk potential RP through the actuation reaction force of the accelerator pedal 72, the system 1 can control the braking and driving forces when the chances of contact become high in order to alert the driver.

The controller 50 is configured to notify the driver that the operating state of the automatic braking control is going to change when the deceleration generated by the automatic braking control is predicted to rise beyond or fall below the prescribed deceleration G1 after a prescribed amount of time has elapsed. More specifically, when the deceleration of the host vehicle is predicted to rise beyond the deceleration G1 after a prescribed time as shown in time charts (d) of FIG. 13, the controller 50 causes the accelerator pedal 72 to exert a supplemental reaction force ΔFp and the speaker 60 to emit an alarm sound. Similarly, when the deceleration of the host vehicle is predicted to fall below the deceleration G1 after a prescribed time as shown in time charts (d) of FIG. 14, the controller 50 causes the accelerator pedal 72 to stop vibrating. In this way, the driver can be informed in advance that the deceleration will begin to reach a prescribed value G1 corresponding to heavy braking of the host vehicle or that the generation of such a deceleration will end. As a result, the driver can be made aware of changes in the operating state of the automatic braking control in advance and can perform appropriate driving operations to accommodate such changes.

The controller 50 is configured to notify the driver by causing the accelerator pedal 72 to exert a supplemental reaction force ΔFp in single bursts. In this way, the notification can be accomplished effectively because the accelerator pedal 72 (which is a driver-operated driving operation device) is touched by the driver very frequently while driving the host vehicle.

The controller 50 is also configured to notify the driver by causing the accelerator pedal 72 to vibrate. By causing the accelerator pedal 72 to vibrate, the driver can be made aware in an intuitive manner that the driving circumstances are not normal. Also, by ending the vibration of the accelerator pedal 72, the driver can be made aware in an intuitive manner that the automatic braking control will soon end.

The controller 50 is configured to urge the driver to perform a recommended driving operation by increasing the actuation reaction force exerted by the accelerator pedal 72 for a prescribed period of time ΔTm. More specifically, as shown in time chart (c) of FIG. 15, the increase amount ΔFm is added to the actuation reaction force of the accelerator pedal 72 for the prescribed amount of time ΔTm. As a result, the accelerator pedal 72 feels stiff (difficult to depress) when the driver starts to depress the accelerator pedal 72 and the driver can be made aware in an intuitive manner that the automatic braking control is operating in such a state that the deceleration is larger than the prescribed deceleration G1. By increasing the actuation reaction force and thereby causing the accelerator pedal 72 to depressed more gradually, the throttle valve opening degree corresponding to the accelerator pedal actuation amount SA is made to increase more gradually. Thus, when the automatic braking control is causing the host vehicle to decelerate, the ability of the driver to increase the driving force by depressing the accelerator can be suppressed. In such a case, the suppression of depression of the accelerator pedal 72 and the switching from depression of the accelerator pedal to operation of the brake correspond to the aforementioned recommended driving operation.

Second Embodiment

Figure 17:
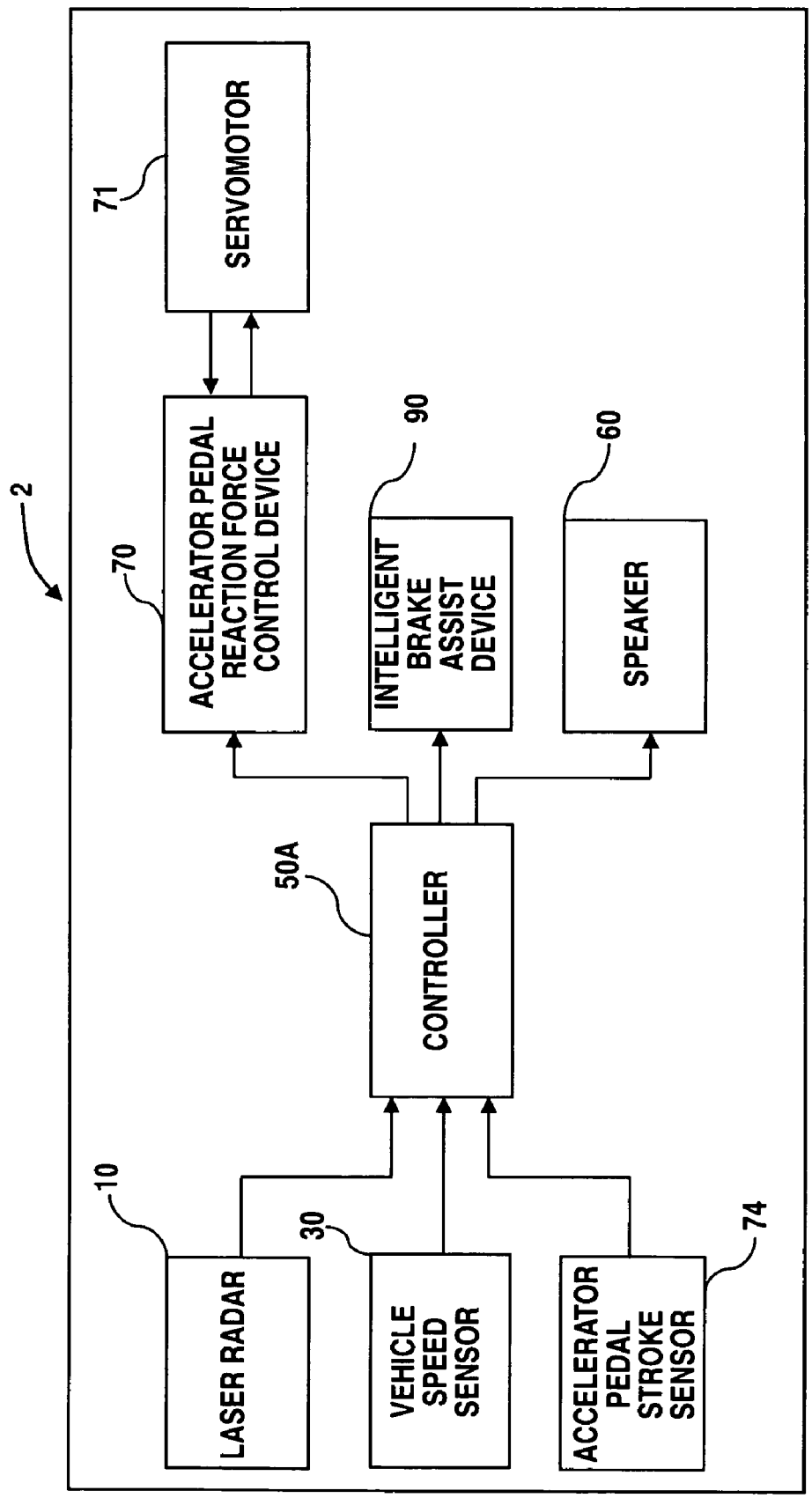
FIG. 17 is a block diagram of a vehicle driving assist system in accordance with a second embodiment of the present invention.

A vehicle driving assist system in accordance with a second embodiment of the present invention will now be explained. FIG. 17 is a system diagram of the vehicle driving assist system 2 in accordance with the second embodiment. In FIG. 17, parts having the same functions as the parts of the first embodiment shown in FIGS. 1 and 2 are indicated with the same reference numerals. The second embodiment will be explained chiefly by describing its differences with respect to the first embodiment.

As shown in FIG. 17, the vehicle driving assist system 2 in accordance with the second embodiment has a collision speed reducing device or intelligent brake assist (IBA) device 90 instead of an automatic deceleration control device 80. The intelligent brake assist device 90 is configured to operate in situations where the host vehicle is following a preceding vehicle and the system determines that the host vehicle is at risk of contacting the preceding vehicle or that it is necessary for the driver to execute an emergency avoidance operation immediately. In such situations, the intelligent brake assist device 90 sounds an alarm so as to urge the driver to perform a driving operation and executes automatic braking in order to avoid a collision with the preceding vehicle (obstacle) or reduce the impact of contact with the preceding vehicle. Therefore, the intelligent brake assist device 90 executes override braking that ignores the operation of the brake pedal 84 by the driver.

The basic constituent features of the intelligent brake assist device 90 are the same as the automatic deceleration control device 80 of the first embodiment. The main difference is that the intelligent brake assist device 90 is intended to execute braking control in order to reduce the effects of contact with a preceding vehicle (or other obstacle). Thus, the intelligent brake assist device 90 starts operating at a higher degree of convergence with respect to the preceding vehicle than the automatic deceleration control device 80 of the first embodiment. Therefore, in the second embodiment, the system 2 is configured to notify the driver in advance that the intelligent brake assist device 90 will commence braking control and urge the driver to operate the brake pedal 84 immediately. Hereinafter, the automatic braking control executed by the intelligent brake assist device 90 shall be called "collision speed reduction control."

Figure 18:
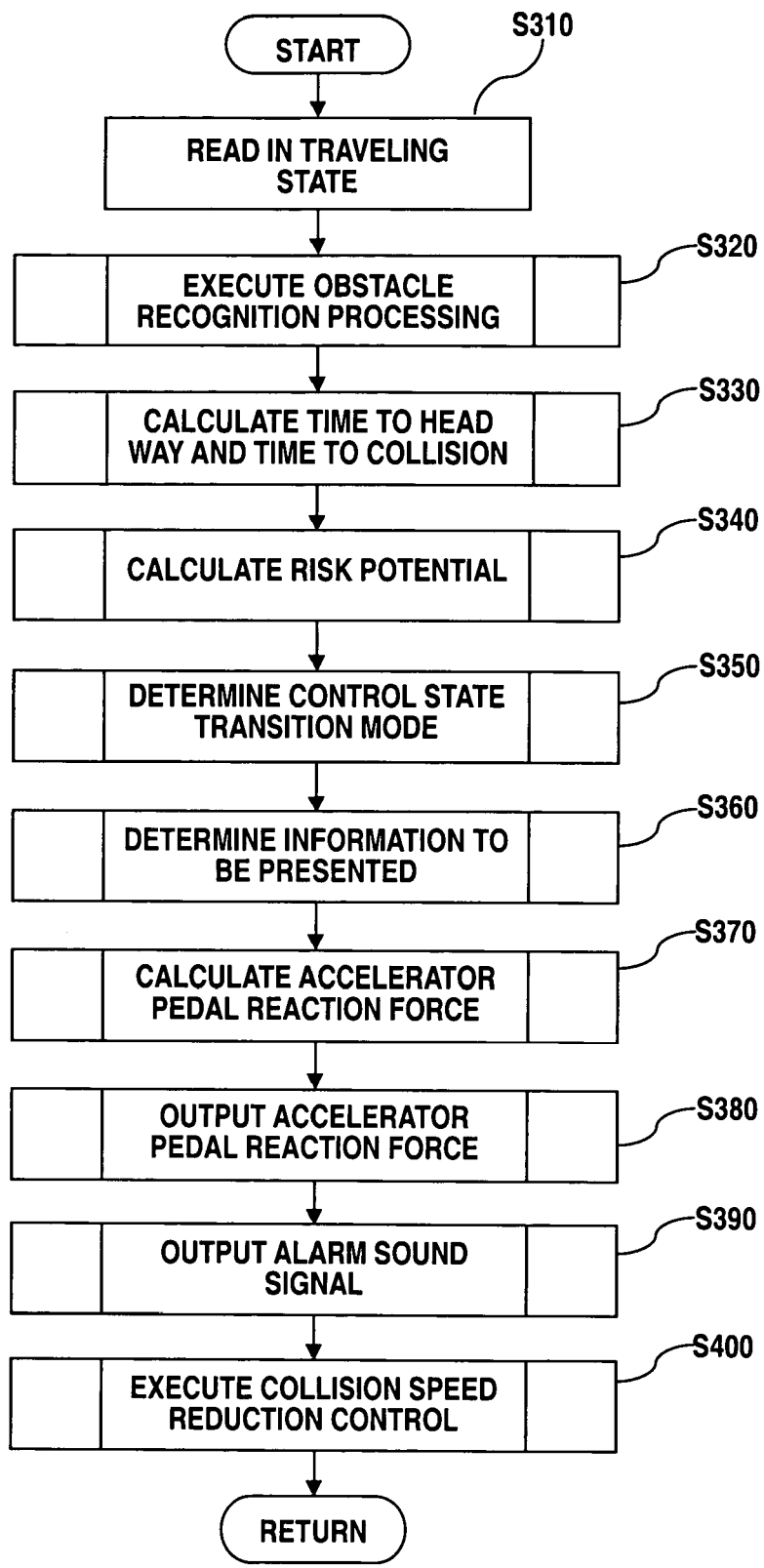
FIG. 18 is a flowchart showing the processing steps of a driving assistance control program in accordance with the second embodiment of the present invention.

The operation of a vehicle driving assist system 2 in accordance with the second embodiment will now be explained with reference to FIG. 18. FIG. 18 is a flowchart showing the processing steps of a driving assistance control program used by the controller 50A. This control loop is executed continuously once per prescribed time period, e.g., every 50 msec. The control processing of the steps S310 to S340 is the same as in steps S10 to S140 of the flowchart shown in FIG. 7 and explanations of these steps are omitted for the sake of brevity.

In step S350, the controller 50A determines the control state transition mode of the system 2. More specifically, as shown in FIG. 19, the controller 50A determines which of the control state transition modes 11 to 17 the system 2 is in based on the operating state of the intelligent brake assist device 90 and the actuation state of the accelerator pedal 72.

Mode 11 of the system 2 exists when the collision speed reduction control executed by the intelligent brake assist device 90 changes from an OFF state (not being executed) to an ON state (being executed) while the accelerator pedal 72 is being actuated (depressed). Mode 12 of the system 2 exists when the collision speed reduction control changes from an ON state to an OFF state while the accelerator pedal 72 is being actuated. Mode 13 of the system 2 exists when the accelerator pedal 72 begins to be actuated while the collision speed reduction control is in an ON state. Mode 14 of the system 2 exists when the accelerator pedal 72 is released while the collision speed reduction control is in an ON state. Mode 15 of the system 2 exists when the collision speed reduction control changes from an OFF state to an ON state while the accelerator pedal 72 is not being actuated. Mode 16 of the system 2 exists when the collision speed reduction control changes from an ON state to an OFF state while the accelerator pedal 72 is not being actuated. Otherwise, Mode 17 of the system 2 exists when the collision speed reduction control is in the OFF state and the accelerator pedal 72 is either on (actuated) or off (released).

The intelligent brake assist device 90 is configured to determine if the collision speed reduction control should be ON or OFF based, for example, on the time to collision TTC between the host vehicle and a preceding obstacle. More specifically, the intelligent brake assist device 90 determines that the collision speed reduction control should be put into the ON state if the time to collision TTC is smaller than a threshold value TTCth set for the purpose of determining when the control should be started. Meanwhile, the intelligent brake assist device 90 determines that the collision speed reduction control should be put into the OFF state if the time to collision TTC is equal to or larger than the threshold value TTCth.

The controller 50A calculates an amount of time (time to control start) $t_{iba}$ expressing the amount of time until the collision speed reduction control will start. The time tiba is used to notify the driver that the collision speed reduction control will start. The time to control start $t_{iba}$ is calculated using, for example, the aforementioned Equation 7 and expresses the amount of time until the time to collision TTC falls to the threshold value TTCth. When Equation 7 is used, the inverse of the value TTCth is used for the prescribed value b. In the second embodiment, the system 2 predicts that the collision speed reduction control will commence in the future when the time to control start $t_{iba}$ reaches a prescribed value, e.g., 1 second. Then, the controller 50A proceeds to the next step S360 where it determines the information to be presented in order to notify the driver.

In step S360, the controller 50A determines the information to be presented to the driver based on the time to control start $t_{iba}$ and the control state transition mode determined in step S350. FIG. 20 is a table showing the information presented to the driver for each control state transition mode. When the system 2 is in Mode 11, the controller 50A notifies the driver that the vehicle behavior will change due to the collision speed reduction control shifting to the ON state by increasing the reaction force of the accelerator pedal 72 all at once such that the accelerator pedal 72 is rapidly lifted or moved toward a released state such that the driver cannot depress the accelerator pedal 72 and issuing a continuous alarm sound from the speaker 60 before the transition to the ON state occurs, i.e., when the time to control start $t_{iba}$ has fallen to 1 sec.

When the system 2 is in Mode 15, the controller 50A notifies the driver that the vehicle behavior will change due to the collision speed reduction control shifting to the ON state by issuing a continuous alarm sound from the speaker 60 before the transition to the ON state occurs, i.e., when the time to control start $t_{iba}$ has fallen to 1 sec. When the collision speed reduction control is in the ON state, the accelerator pedal 72 is rapidly lifted or moved toward a released state such that the driver cannot depress the accelerator pedal and a continuous alarm sound is emitted from the speaker 60 regardless of the mode determined in step S350. When the system 2 is in any mode other than Mode 11, 12, 13 or 15, no information is presented to inform the driver that the operating state of the collision speed reduction control will change.

In step S370, the controller 50 calculates a reaction force control command value FA for the actuation reaction force to be exerted by (generated in) the accelerator pedal 72 based on the risk potential RP calculated in step S340 and the information determined in step S360. When it determines to rapidly lift the accelerator pedal 72 in step S340, the controller 50A corrects the accelerator pedal reaction force control command value FA to an upper limit value FAlim that is larger than the maximum value FAmax. The upper limit value FAlim is set a value sufficiently large that the driver cannot depress the accelerator pedal 72.

In step S380, the controller 50A sends the accelerator pedal reaction force control command value FA calculated in step S370 to the accelerator pedal reaction force control device 70. In step S390, if it has determined in step S360 that an alarm sound will be emitted, the controller 50A causes the speaker 60 to emit a continuous beep sound at a timing synchronized with the rapid lifting of the accelerator pedal 72. In step S400, the intelligent brake assist device 90 executes collision speed reduction control if it has been determined that there is a danger of contact. After the command values are sent, the current control loop ends.

The operational effects of the second embodiment will now be explained with reference to the drawings. The time charts (a) to (c) of FIGS. 21 and 22 show how the operating state of the collision speed reduction control, the accelerator pedal actuation reaction force, and the information presented to the driver change over time during each of Modes 11 and 15, respectively.

Figure 21:
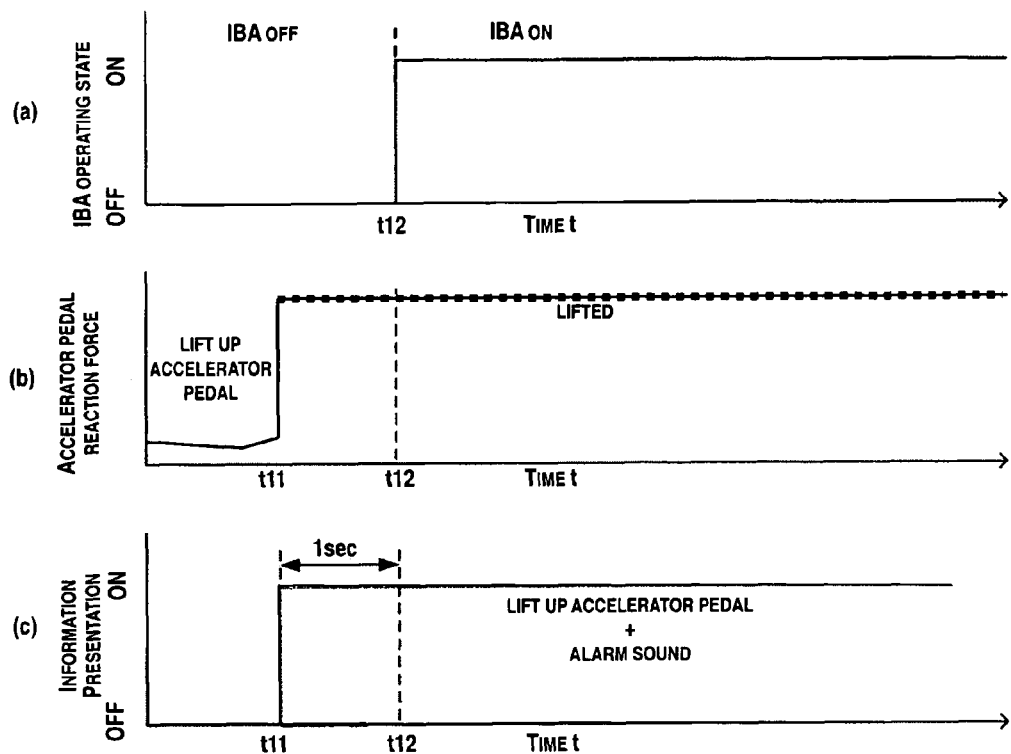
FIG. 21 are a plurality of time charts illustrating how the operating state of the collision speed reduction control, the accelerator pedal actuation reaction force, and the information presented to the driver change over time during Mode 11.

As shown in time charts (a) to (c) of FIG. 21, when the system 2 is in Mode 11, at a time t12 the collision speed reduction control changes from the OFF state to the ON state and causes the host vehicle to decelerate in order to avoid contact with a preceding obstacle or reduce the impact that occurs when the host vehicle collides with the preceding obstacle. The controller 50A consecutively calculates the amount of time $t_{iba}$ (time to control start) required for the time to collision TTC to reach the threshold value TTCth and when the time to control start $t_{iba}$ falls to 1 second (at the time t11), the controller 50A increases the reaction force of the accelerator pedal 72 all at once such that the accelerator pedal 72 is rapidly lifted toward a released state such that the accelerator pedal 72 cannot be depressed and issues a continuous beep sound from the speaker 60. The lifting of the accelerator pedal 72 and the emission of the alarm sound continue while the collision speed reduction control is being executed.

Figure 22:
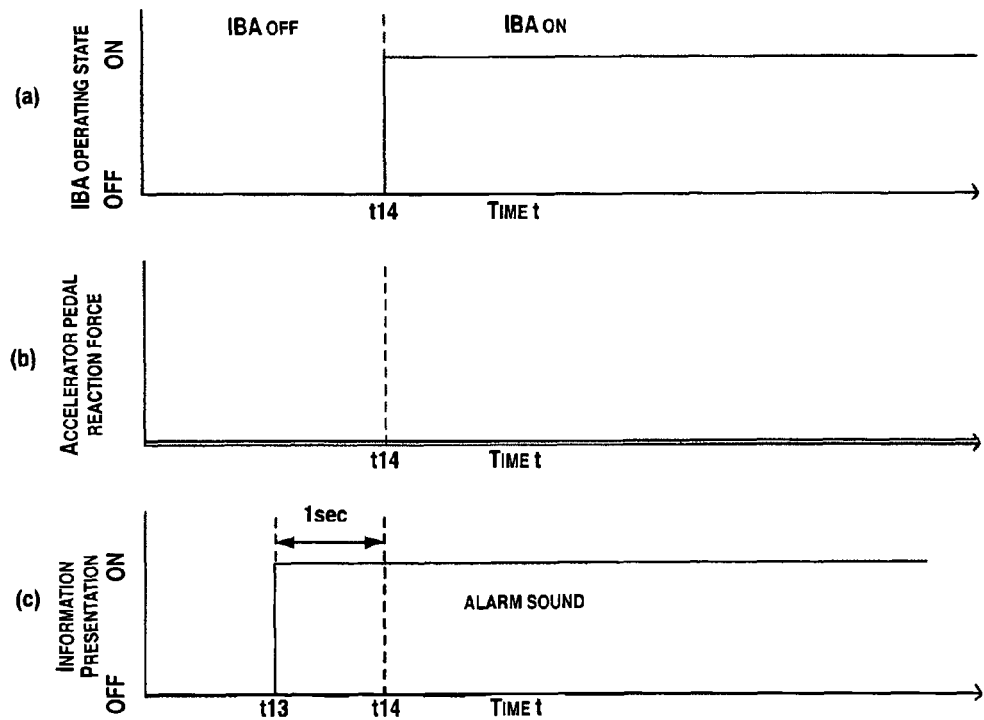
FIG. 22 are a plurality of time charts illustrating how the operating state of the collision speed reduction control, the accelerator pedal actuation reaction force, and the information presented to the driver change over time during Mode 15.

As shown in time charts (a) to (c) of FIG. 22, when the system 2 is in Mode 15, at a time t14 the collision speed reduction control changes from the OFF state to the ON state and causes the host vehicle to decelerate in order to avoid contact with a preceding obstacle or reduce the impact that occurs when the host vehicle collides with the preceding obstacle. At a time t13 occurring before the control shifts to the ON state, i.e., at a time when the time to control start $t_{iba}$ has fallen to 1 second, the controller 50A increases the reaction force of the accelerator pedal 72 all at once such that the accelerator pedal 72 is rapidly lifted toward a released state such that the accelerator pedal 72 cannot be depressed and issues a continuous beep sound from the speaker 60. The lifting of the accelerator pedal 72 and the emission of the alarm sound continue while the collision speed reduction control is being executed.

In addition to the operational effects exhibited by the first embodiment, the second embodiment also achieves the following additional effects.

The vehicle driving assist system 2 is configured to determine the chances of contact between the host vehicle in which the system 2 is installed and an object and, when it determines that the chances of contact are high, execute a vehicle behavior control that functions to avoid contact or reduce the impact of the contact. More specifically, the system 2 brakes the host vehicle in an overriding manner when the chances of contact are determined to be high based on the time to collision TTC between the host vehicle and the preceding obstacle. Thus, in addition to notifying the driver of the risk potential RP through the actuation reaction force of the accelerator pedal 72, the system 2 can reduce the effects of the contact when contact between the host vehicle and a preceding obstacle cannot be avoided.

In addition to providing advanced notice regarding the future operating state of the host vehicle behavior control, the vehicle driving assist system 2 is also configured to urge the driver to perform a recommended driving operation suited to the operating state of the host vehicle behavior control. More specifically, by lifting the accelerator pedal 72 such that it cannot be depressed by the driver before executing the braking control for reducing the impact, the system 2 urges the driver to quickly switch from depressing the accelerator pedal 72 to depressing the brake pedal 84. Thus, the "recommended driving operation" is the switching from accelerator pedal operation to brake pedal operation. By nudging the driver toward a recommended driving operation in addition to notifying the driver of that the operating state of the control will change, the driver can be urged to adopt an appropriate driving operation at an earlier stage.

The controller 50A is configured to notify the driver by lifting the accelerator pedal 72 such that the driver cannot depress the accelerator pedal 72. As a result, when braking control will be commenced in order to reduce the impact of a collision, the driver can be urged to actuate (depress) the brake pedal earlier.

Third Embodiment

Figure 23:
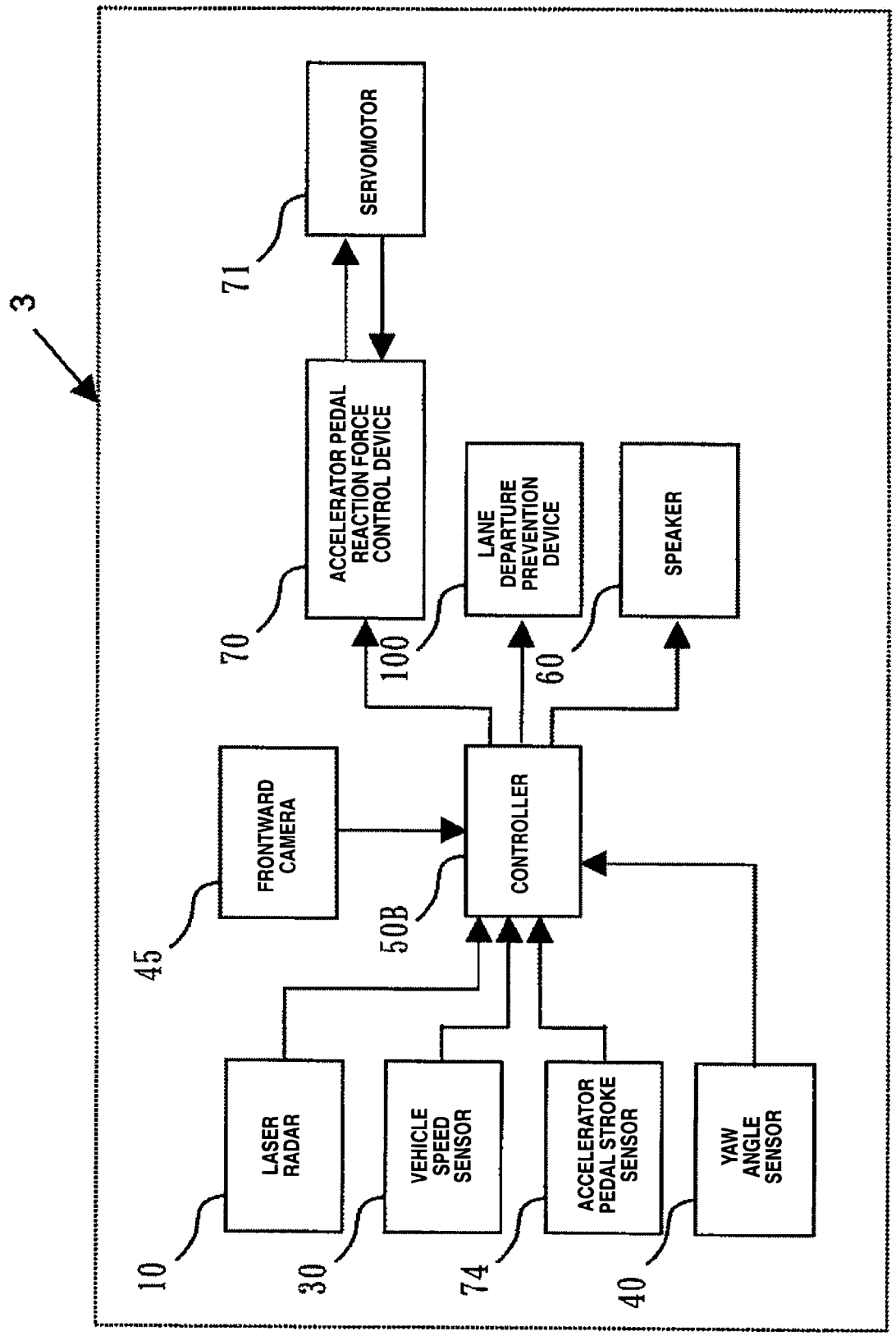
FIG. 23 is a block diagram of a vehicle driving assist system in accordance with a third embodiment of the present invention.

A vehicle driving assist system in accordance with a third embodiment of the present invention will now be explained. FIG. 23 is a system diagram of the vehicle driving assist system 3 in accordance with the third embodiment. In FIG. 23, parts having the same functions as the parts of the first embodiment shown in FIGS. 1 and 2 are indicated with the same reference numerals. The third embodiment will be explained chiefly by describing its differences with respect to the first embodiment.

As shown in FIG. 23, the vehicle driving assist system 3 in accordance with the third embodiment has a lane departure preventing (LDP) device 100 instead of an automatic deceleration control device 80. The lane departure preventing device 100 executes a lane departure prevention control contrived to prevent lane departure when there is the possibility that the host vehicle in which the system 3 is installed will depart from the lane in which it is traveling. The lane departure preventing device 100 is configured to control the braking force (brake fluid pressure) applied to each of the wheels (front and rear, left and right) individually. When there is the possibility that the host vehicle will depart from its lane, the lane departure preventing device 100 creates a braking force difference between the left and right wheels so as to generate a yaw moment oriented in such a direction as to prevent the departure.

A brake device 85 controlled by the lane departure preventing device 100 is provided on each wheel of the host vehicle. Each brake device 85 includes a brake disk and a wheel cylinder that is configured and arranged to operate using hydraulic pressure and to frictionally pinch the brake disk and apply a brake force (braking force) to the wheel when hydraulic pressure is supplied thereto. The lane departure preventing device 100 can brake each wheel individually by supplying hydraulic pressure to the wheel cylinder of each brake device 85 individually. The lane departure preventing device 100 has a separate actuator for the hydraulic pressure supply line (brake fluid channel) of each of the wheels. Each actuator is, for example, a proportional solenoid valve that can be controlled such that any desired brake fluid pressure is supplied to the respective wheel cylinder. In accordance with a command from the controller 50B, the lane departure preventing device 100 adjusts the hydraulic pressure delivered from a master cylinder when the brake pedal 84 is operated and controls the brake fluid pressure supplied to the wheel cylinder of each wheel.

The vehicle driving assist system 3 is also provided with a yaw angle sensor 40 for detecting the yaw angle of the host vehicle with respect to a lane line and a frontward camera 45 for photographing a region in front of the host vehicle. The frontward camera 45 is a small CCD camera, CMOS camera, or the like mounted in an upper part of the front windshield and functions to capture an image of the road situation in front of the host vehicle and send the image to the controller 50B. The detection region of the frontward camera 45 is a region within ±30 degrees horizontally with respect to the longitudinal centerline of the host vehicle. The frontward camera 45 captures an image of the forward road situation within this detection region.

Figure 24:
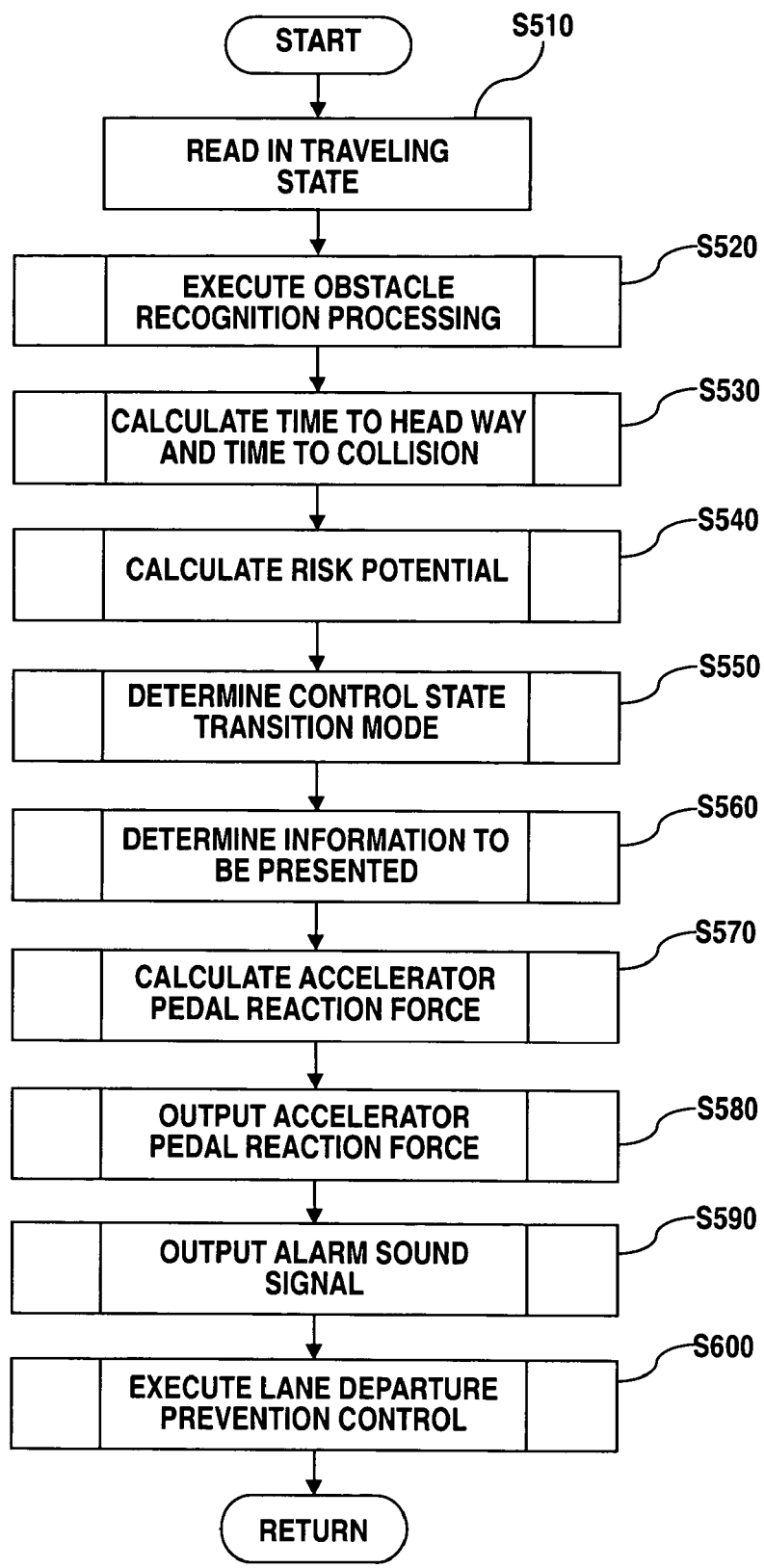
FIG. 24 is a flowchart showing the processing steps of a driving assistance control program in accordance with the third embodiment of the present invention.

The operation of a vehicle driving assist system 3 in accordance with the third embodiment will now be explained with reference to FIG. 24. FIG. 24 is a flowchart showing the processing steps of a driving assistance control program used by the controller 50B. This control loop is executed continuously once per prescribed time period, e.g., every 50 msec. The control processing of the steps S510 to S540 is the same as in steps S110 to S140 of the flowchart shown in FIG. 7 and explanations of these steps are omitted for the sake of brevity.

Figure 25:
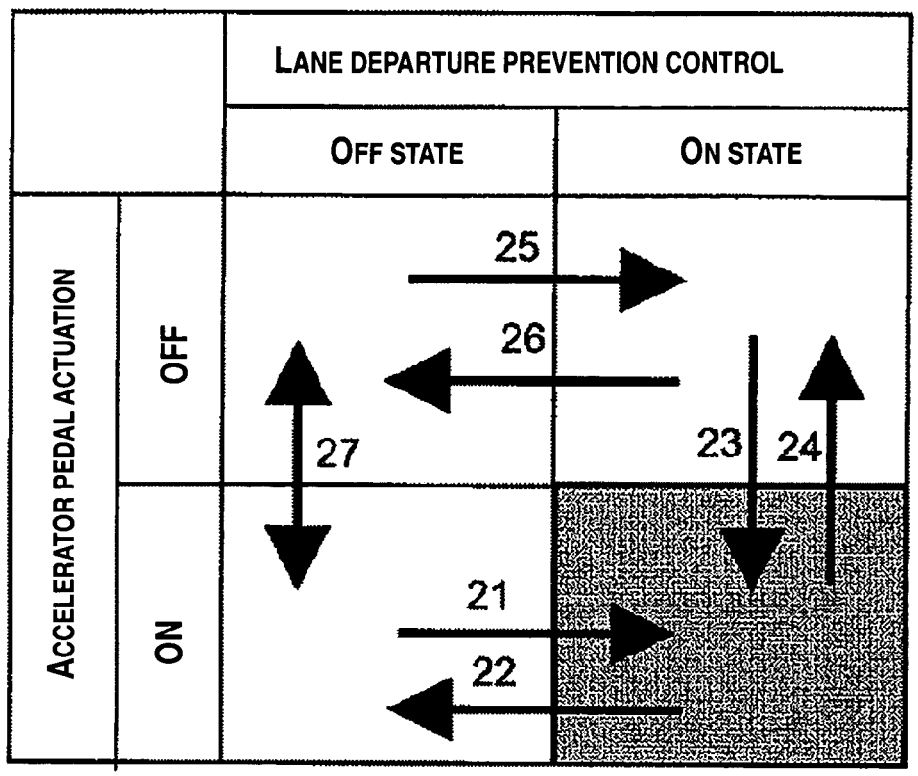
FIG. 25 is a diagram illustrating a concept of determining the control state transition mode based on the operating state of the lane departure prevention control and the actuation amount of the accelerator pedal.

In step S550, the controller 50B determines the control state transition mode. More specifically, as shown in FIG. 25, the controller 50B determines which of the control state transition modes 21 to 27 the system 3 is in based on the operating state of the lane departure prevention control and the actuation state of the accelerator pedal 72.

Mode 21 of the system 3 exists when the lane departure prevention control changes from an OFF state (not being executed) to an ON state (being executed) while the accelerator pedal 72 is being actuated. Mode 22 of the system 3 exists when the lane departure prevention control changes from an ON state to an OFF state while the accelerator pedal 72 is being actuated. Mode 23 of the system 3 exists when the accelerator pedal 72 begins to be actuated (depressed) while the lane departure prevention control is in an ON state. Mode 24 of the system 3 exists when the accelerator pedal 72 is released while the lane departure prevention control is in an ON state. Mode 25 of the system 3 exists when the lane departure prevention control changes from an OFF state to an ON state while the accelerator pedal 72 is not being actuated. Mode 26 of the system 3 exists when the lane departure prevention control changes from an ON state to an OFF state while the accelerator pedal 72 is not being actuated. Otherwise, Mode 27 of the system 3 exists when the lane departure prevention control is in the OFF state and the accelerator pedal 72 is either on (actuated) or off (released).

The lane departure preventing device 100 is configured to determine if the lane departure prevention control should be ON or OFF based on a predicted lateral position of the host vehicle after a prescribed amount of time has elapsed. More specifically, when a predicted lateral position X indicating what the lateral position of the host vehicle will be after a prescribed amount of time has elapsed is outside the lane in which the host vehicle is traveling, the lane departure preventing device 100 determines that the lane departure prevention control should be ON. If the predicted lateral position X is inside the lane in which the host vehicle is traveling, the LDP determines that the predicted lateral position X should be OFF.

Figure 26:
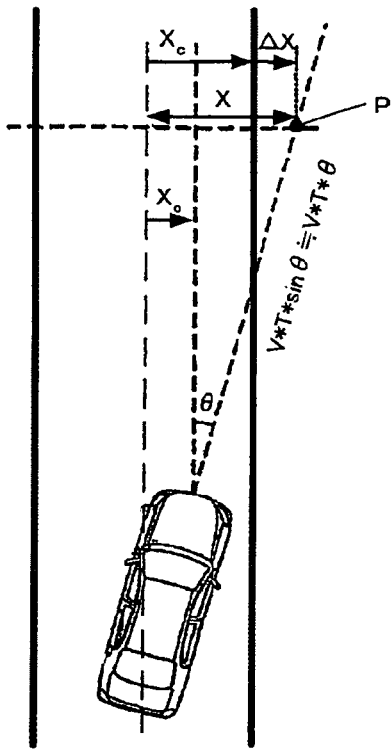
FIG. 26 is a diagram for explaining how the amount of departure from the lane is calculated.

FIG. 26 shows a predicted lateral position X of where the host vehicle will after a prescribed amount of time T (in seconds) has elapsed. If the host vehicle reaches a frontward position P after the time T has elapsed, then the lateral distance from the current lateral position of the host vehicle to the position P is given by V×T×sin θ, where θ is the yaw angle of the host vehicle detected by the yaw angle sensor 40 and V is the host vehicle speed. When the yaw angle θ is very small, the expression V×T×sin θ can be approximated as V×T×θ and the predicted lateral position X of the host vehicle after the prescribed time T can be calculated with Equation 9 shown below.

$$X = X0 + (V \times T \times \theta) \quad \text{(Equation 9)}$$

In Equation 9, the value X0 is the current lateral position of the host vehicle. The current lateral position X0 can be calculated, for example, by applying image processing to the frontward image captured by the frontward camera 45.

The departure amount ΔX by which the host vehicle will have departed from the lane after the time T has elapsed is expressed as shown in Equation 10 below, where Xc is the distance from the centerline of the lane to the edge of the lane, i.e., one half of the width of the lane.

$$\Delta X = X - Xc \quad \text{(Equation 10)}$$

When the departure amount ΔX calculated with Equation 10 is larger than 0, the lane departure preventing device 100 determines that the host vehicle will depart from the lane after the prescribed amount of time T (seconds) and starts the lane departure prevention control. The prescribed amount of time T is, for example, 1 second.

The controller 50B predicts when the lane departure prevention control will start in order to notify the driver in advance that the lane departure prevention control will start. More specifically, the controller 50B predicts when the control will start based on a departure amount ΔX of the host vehicle after a time T+tb, where T is the aforementioned prescribed amount of time and tb is greater than 0 (e.g., 0.5 seconds). Then, using Equations 9 and 10, the controller 50B calculates the departure amount ΔXtb that will exist after the time T+tb has elapsed. If the departure amount ΔXtb is larger than 0, the controller 50B determines that the lane departure prevention control will soon start. If the departure amount ΔXtb is equal to or smaller than 0, the controller 50B determines that the lane departure prevention control will soon end. Then, in step S560, the controller 50B determines the information that will be presented in order to notify the driver.

In step S560, the controller 50B determines the information to be presented to the driver based on the departure amount ΔXtb and the control state transition mode determined in step S550. FIG. 27 is a table showing the information presented to the driver for each control state transition mode. When the system 3 is in Mode 21, the controller 50B notifies the driver that the vehicle behavior will change due to the lane departure prevention control shifting to the ON state by causing the accelerator pedal 72 to exert a pulsed supplemental reaction force and issuing an alarm sound from the speaker 60 before the transition to the ON state occurs, i.e., when the departure amount ΔXtb has become larger than 0. After the control has shifted to the ON state, the controller 50B causes the accelerator pedal 72 to vibrate.

When the system 3 is in Mode 22, the controller 50B notifies the driver that the vehicle behavior will change due to the lane departure prevention control shifting to the OFF state by stopping the vibration of the accelerator pedal 72 before the transition to the OFF state occurs, i.e., when the departure amount ΔXtb has become smaller than 0. When the system 3 is in Mode 23, the controller 50B increases the actuation reaction force of the accelerator pedal 72 for a prescribed amount of time in order to make the driver aware that the lane departure prevention control is in the ON state. The amount of time that the actuation reaction force is increased is set to be longer than the pulsed supplemental reaction force is generated in Mode 21. The accelerator pedal 72 is also vibrated during Mode 23.

However, in Mode 23, if the host vehicle (driver) is attempting to change lanes, the controller 50B does not notify the driver that the lane departure prevention control is in the ON state. In other words, the system 3 is configured to avoid disrupting the driver's operation of the host vehicle when the driver is deliberately depressing the accelerator pedal 72 in order to change lanes. The intent of the driver to change lanes can be detected based on, for example, the actuation state of a directional (turn signal) (not shown) and the actuation speed of the accelerator pedal 72.

When the system 3 is in Mode 24, the controller 50B does not present any information because the driver has already been made aware during Mode 23 that the lane departure prevention control is in the ON state. When the system 3 is in Mode 25, the controller 50B notifies the driver that the vehicle behavior will change due to the lane departure prevention control shifting to the ON state by causing the speaker 60 to emit an alarm sound before the transition to the ON state occurs, i.e., when the departure amount ΔXtb has become larger than 0. No information is presented in Modes 26 and 27.

In step S570, the controller 50B calculates a reaction force control command value FA and a supplemental reaction force ΔFp for the actuation reaction force to be exerted by (generated in) the accelerator pedal 72 based on the risk potential RP calculated in step S540 and the information determined in step S560. In step S580, the controller 50B sends the accelerator pedal reaction force control command value FA and the supplemental reaction force ΔFp or other quantity for presenting information to the driver calculated in step S570 to the accelerator pedal reaction force control device 70. In step S590, if it has determined in step S560 that an alarm sound will be emitted, the controller 50B causes the speaker 60 to emit a beep sound in single bursts at timings synchronized with the generation of the supplemental reaction force ΔFp in the accelerator pedal 72.

In step S600, the lane departure preventing device 100 executes lane departure prevention control if it has been determined that there is a possibility that the host vehicle will depart from the lane in which it is traveling. More specifically, based on the departure amount ΔX, the lane departure preventing device 100 calculates a target yaw moment to be imposed on the host vehicle in order to avoid departing from the lane. The lane departure preventing device 100 then controls the target brake fluid pressures of the wheels (front and rear, left and right) so as to generate braking force differentials among the front and rear and the left and right wheels and create the target yaw moment. After the command values are sent, the current control loop ends.

The operational effects of the third embodiment will now be explained with reference to the drawings. The time charts (a) to (c) of FIGS. 28 to 31 show how the operating state of the lane departure prevention control, the accelerator pedal actuation reaction force, and the information presented to the driver change over time during each of Modes 21, 22, 23, and 25, respectively.

As shown in time charts (a) to (c) of FIG. 28, when the system 3 is in Mode 21, the accelerator pedal 72 is made to exert a reaction force equal to a accelerator pedal reaction force control command value FA corresponding to the risk potential RP and the lane departure prevention control begins to decelerate the host vehicle at a time t22 when the chances of departure from the lane become high. The controller 50B consecutively computes the departure amount ΔXtb, i.e., the amount by which the host vehicle will have departed from the lane after the amount of time T+tb (seconds) has elapsed. At the time t21 when the departure amount ΔXtb becomes larger than 0, the controller 50B executes control that causes the accelerator pedal 72 to exert a pulsed supplemental reaction force ΔFp two times in succession and causes the speaker 60 to emit a single-burst beep sound two times in succession. After the time t22 when the lane departure prevention control shifts to the ON state, the accelerator pedal 72 exerts an actuation reaction force in accordance with the risk potential RP and also vibrates continuously. Also, the lane departure prevention control executes yaw control starting at the time t22.

Figure 29:
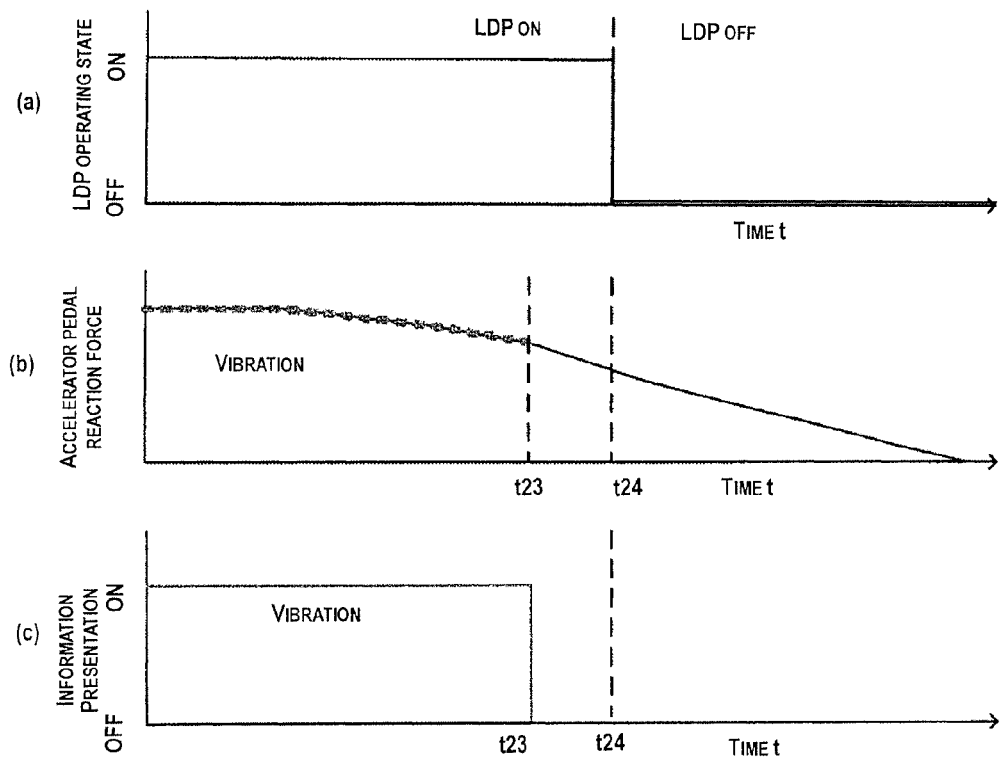
FIG. 29 are a plurality of time charts illustrating showing how the operating state of the lane departure prevention control, the accelerator pedal actuation reaction force, and the information presented to the driver change over time during Mode 22.

As shown in time charts (a) to (d) of FIG. 29, when the system 3 is in Mode 22, yaw control is executed by the lane departure prevention control and the accelerator pedal 72 is controlled so as to both vibrate and exert a reaction force equal to an accelerator pedal reaction force control command value FA corresponding to the risk potential RP. The controller 50B ends the vibration of the accelerator pedal 72 at a time t23 when the departure amount ΔXtb falls below 0, which occurs before the time t24 when the lane departure prevention control shifts to the OFF state.

Figure 30:
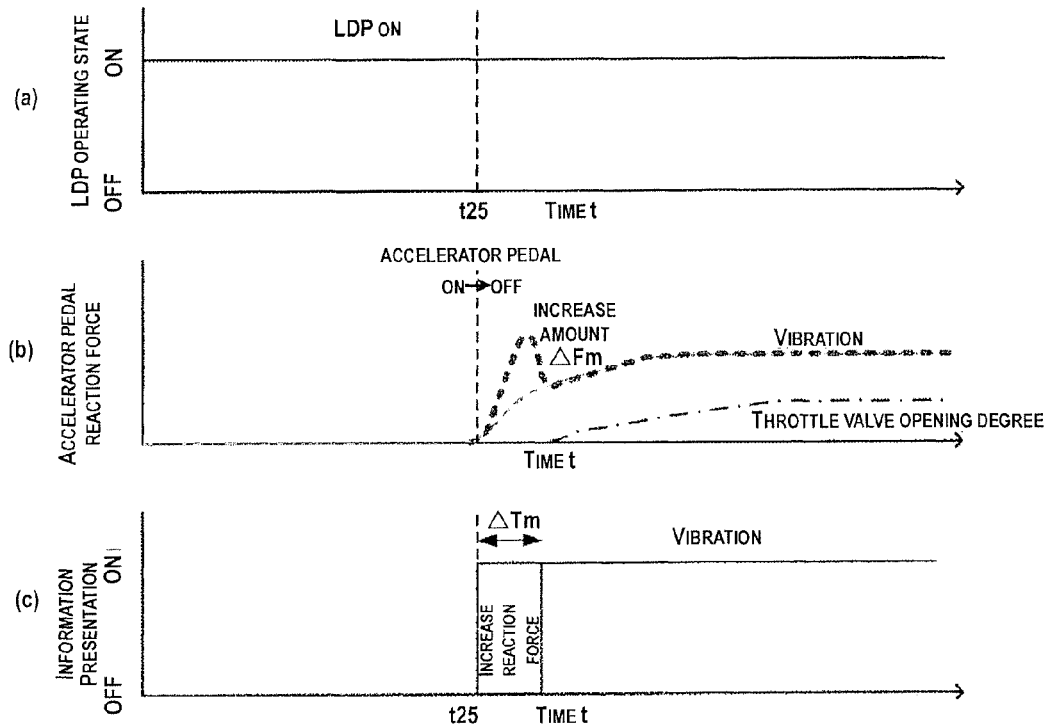
FIG. 30 are a plurality of time charts illustrating how the operating state of the lane departure prevention control, the accelerator pedal actuation reaction force, and the information presented to the driver change over time during Mode 23.

As shown in time charts (a) to (c) of FIG. 30, when the system 3 is in Mode 23, the lane-departure prevention control stays in the ON state. When the accelerator pedal 72 is depressed at the time t25, the accelerator pedal 72 is controlled so as to exert a reaction force equal to the sum of the accelerator pedal reaction force control command value FA corresponding to the risk potential RP and an increase amount ΔFm for a prescribed amount of time ΔTm. After the time ΔTm has elapsed, the increase amount ΔFm is removed and only the command value FA is exerted. The accelerator pedal 72 also vibrates during Mode 23. As indicated with the single-dot chain line in time chart (b) of FIG. 30, the throttle valve opening degree increases gradually as a result of the temporary increase in the accelerator pedal reaction force.

Figure 31:
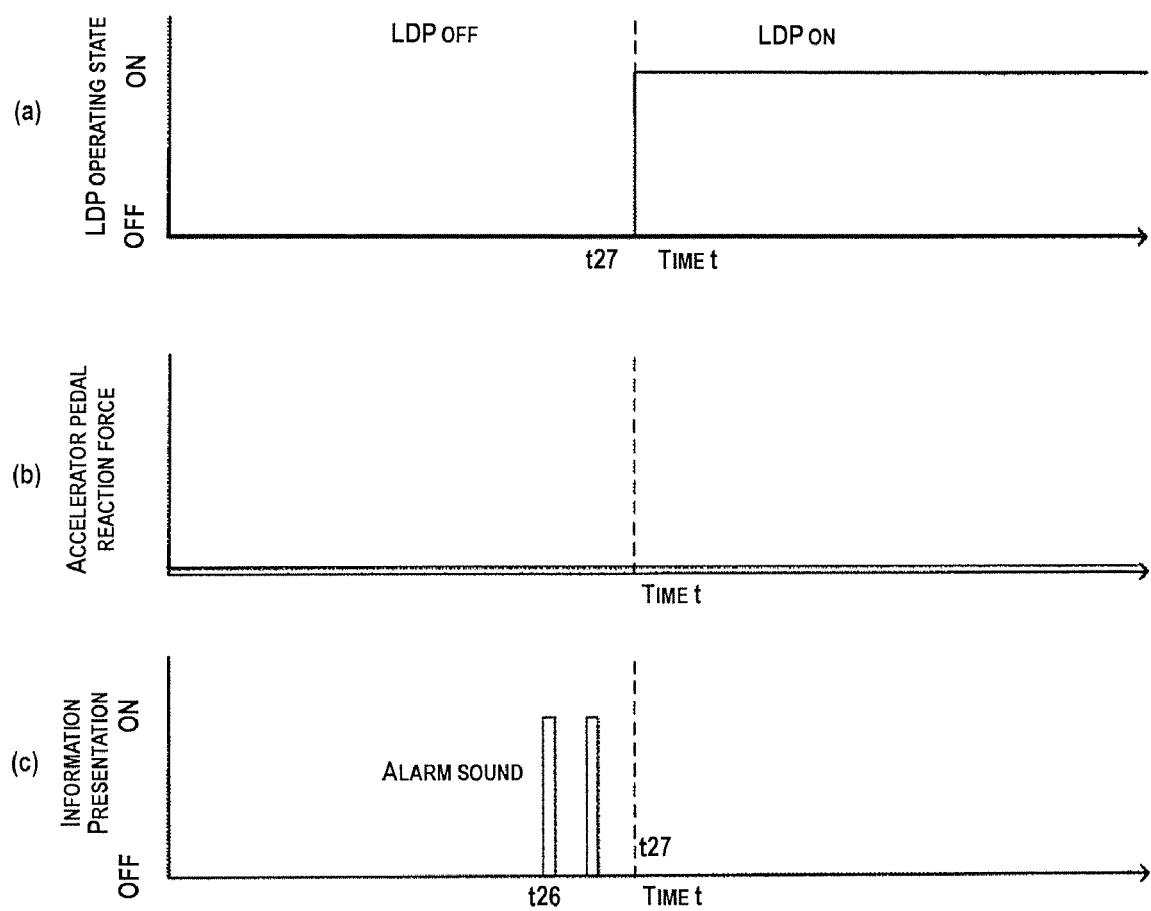
FIG. 31 are a plurality of time charts illustrating how the operating state of the lane departure prevention control, the accelerator pedal actuation reaction force, and the information presented to the driver change over time during Mode 25.

As shown in time charts (a) to (c) of FIG. 31, when the system 3 is in Mode 25, the lane departure prevention control is started at a time t27 when the chances of departure from the lane become high. At a time t26 occurring earlier than the time t27, i.e., when the departure amount ΔXtb becomes larger than 0, the controller 50B executes control that causes the speaker 60 to emit a single-burst beep sound two times in succession. Since the accelerator pedal 72 is not being operated, neither a supplemental reaction force ΔFb nor a vibration is generated.

In addition to the operational effects exhibited by the first embodiment, the third embodiment also achieves the following additional effects.

The vehicle driving assist system 3 is configured to calculate the lateral position X of the host vehicle in which the system 3 is installed with respect to the lane in which the host vehicle is traveling. Then, based on the lateral position X, the system 3 determines if there is a possibility that the host vehicle will depart from the lane. When the possibility of lane departure is determined to be high, the system 3 executes a vehicle behavior control that functions to prevent the host vehicle from departing from the lane. As a result, in addition to informing the driver of the risk potential RP through the actuation reaction force of the accelerator pedal 72, the system 3 can prevent the host vehicle from departing from the lane in which it is traveling when the chances of departure are high by executing yaw control of the host vehicle.

The controller 50B notifies the driver by causing the accelerator pedal 72 to exert a supplemental reaction force ΔFp in single bursts. In this way, the notification can be accomplished effectively because the accelerator pedal 72 (which is a driver-operated driving operation device) is touched by the driver very frequently while driving the host vehicle.

The controller 50B is also configured to notify the driver by causing the accelerator pedal 72 to vibrate. By causing the accelerator pedal 72 to vibrate, the driver can be made aware in an intuitive manner that the driving circumstances are not normal. Also, by ending the vibration of the accelerator pedal 72, the driver can be made aware in an intuitive manner that the lane departure prevention control has ended.

The controller 50B is configured to urge the driver to perform a recommended driving operation by increasing the actuation reaction force exerted by the accelerator pedal 72 for a prescribed period of time ΔTm. More specifically, as shown in time chart (b) of FIG. 30, the increase amount ΔFm is added to the actuation reaction force of the accelerator pedal 72 for the prescribed amount of time ΔTm. As a result, the accelerator pedal 72 feels stiff (difficult to depress) when the driver starts to depress the accelerator pedal 72 and the driver can be made aware in an intuitive manner that the lane departure prevention control is in progress (being executed). By increasing the actuation reaction force and thereby causing the accelerator pedal 72 to depressed more gradually, the throttle valve opening degree corresponding to the accelerator pedal actuation amount SA is made to increase more gradually. As a result, while the lane departure prevention control is executing yaw control by generating a braking force differential between the left wheels and the right wheels, the driving force acting on the host vehicle can be suppressed so as to prevent a large imbalance from occurring between control of the braking forces and control of the driving force. In this embodiment, the suppression of depression of the accelerator pedal 72 is the recommended driving operation.

Since the host vehicle behavior control executed in the third embodiment is a lane departure prevention control that involves behavior of the host vehicle in the lateral direction, it is also possible to use a driver-operated device related to the lateral behavior of the host vehicle, e.g., the steering wheel, as the device through which the driver is notified regarding the operating state of the control or to which the recommended driving operation is applied. In such a case, a supplemental reaction force ΔFp and/or a vibration can be used in the same manner as is used with respect to the accelerator pedal 72 in the first to third embodiments described heretofore.

In the first to third embodiments, the vehicle driving assist system 1, 2, 3 includes the system (device) 80, 90, 100 that controls a behavior of the host vehicle. However, the invention is not limited to such an arrangement. It is also possible for the vehicle driving assist system 1, 2, or 3 to be configured and arranged to receive a signal from an independently provided vehicle behavior control system 80, 90, or 100. For example, in the case of the first embodiment, the controller 50 of the vehicle driving assist system 1 could be configured and arranged to receive a signal indicating the deceleration calculated by the automatic deceleration control device 80 and the controller 50 could make the determination regarding the operating state of the automatic braking control. Or, the automatic deceleration control device 80 could be configured to determine the operating state of the automatic braking control and output a signal indicating the operating state, and the controller 50 could be arranged to receive the signal indicating the operating state. The vehicle driving assist system 1, 2, or 3 is configured to at least notify the driver in advance regarding the operating state of the host vehicle behavior control system 80, 90, or 100.

In the first to third embodiments, the accelerator pedal reaction force control command value FA is calculated based on the risk potential RP using FIG. 12. However, the relationship between the risk potential RP and the reaction force control value FA is not limited to the relationship shown in FIG. 12. For example, it is also possible to configure the system such that the reaction force command value FA increases exponentially (in the manner of an exponential function) with respect to increases in the risk potential RP. It is also possible to arrange for an actuation reaction force based on the risk potential RP to be generated in the brake pedal 84 or another driver-operated device other than the accelerator pedal 72. It is also possible to control the actuation reaction forces of both the accelerator pedal 72 and the brake pedal 84.

In the first to third embodiments, the risk potential RP is calculated using the time to collision TTC and the time to head way THW between the host vehicle and the preceding obstacle. However, it is also possible to define the repelling force (risk potential RPvb) of the imaginary elastic body shown in diagrams (a) and (b) of FIG. 9 as the risk potential RP.

In the second embodiment, the accelerator pedal 72 is made to lift up rapidly by increasing the actuation reaction force to the upper limit in order to notify the driver that the collision speed reduction control will start. However, the invention is not limited to such a method of lifting the accelerator pedal 72. For example, another mechanical method can be used. In short, any of various mechanisms can be used so long as the accelerator pedal 72 can be returned to the release position and held there such that the driver cannot depress the accelerator pedal 72.

In the first to third embodiments, the laser radar 10 and the vehicle speed sensor 30 function as the traveling state detecting section. The controllers 50, 50A, 50B each function as the risk potential calculating section, the collision potential determining section, the lateral position calculating section, and the lane departure determining section. The controllers 50, 50A, 50B and, the alarm 60 and the accelerator pedal reaction force control device 70 function the behavior control operating state notifying section. The controllers 50, 50A, 50B and the accelerator pedal reaction force control device 70 function as the actuation reaction force control section and the driving operation recommending section. The automatic braking force control device 80, the collision speed reducing device 90, and the lane departure prevention device 100 function as the host vehicle behavior control section. Also, the automatic deceleration control device 80 and collision speed reducing device 90 both function as the deceleration (braking/driving) force control section. The collision speed reducing device 90 further functions as the collision avoidance control section. The lane departure preventing device 100 functions as the lane departure prevention control section. However, the invention is not limited to using these particular devices to serve as the sections or components mentioned herein. For example, instead of the laser radar 10, a milliwave radar of a different format can be used as the traveling situation detecting section. The explanations presented above are merely examples. When interpreting the present invention, the invention should not be limited or restrained in any way by the corresponding relationships between the embodiments and the claims.

What is claimed is:

1. A vehicle driving assist system comprising:
    a traveling situation detecting section configured to output a traveling situation detection result based on at least a following distance between a host vehicle and a preceding obstacle and a host vehicle speed of the host vehicle;
    a risk potential calculating section configured to calculate a risk potential indicative of a degree of convergence between the host vehicle and the preceding obstacle based on the traveling situation detection result of the traveling situation detecting section;
    an actuation reaction force control section configured to control an actuation reaction force exerted by an accelerator pedal of the host vehicle based on the risk potential calculated by the risk potential calculating section;
    a host vehicle behavior control section configured to control a behavior of the host vehicle;
    a behavior control operating state notifying section configured to notify a driver in advance of a future operating state of the host vehicle behavior control section while the actuation reaction force control section is executing control of the actuation reaction force exerted by the accelerator pedal;
    a driver operation recommendation section configured to provide the driver with a recommended driving operation in accordance with the future operating state of the host vehicle behavior control section, the recommended driving operation being distinct from notification to the driver of the future operating state; and
    a control state transition mode determination section configured to determine a control state transition mode that indicates how the future operating state of the host vehicle behavior control section will change,
    the behavior control operating state notifying section notifying the driver in advance of the future operating state of the host vehicle behavior control section based on a result of a determination of the control state transition mode determination section, and the driving operation recommendation section determining the recommended driving operation based on the result of the determination of the control state transition mode determination section.

2. The vehicle driving assist system as recited in claim 1, wherein
    the behavior control operating state notifying section is further configured to produce an urging stimulus that urges the driver to perform a recommended driving operation in accordance with the future operating state of the host vehicle behavior control section.

3. The vehicle driving assist system as recited in claim 1, further comprising
    a collision potential determining section configured to determine a possibility that the host vehicle will contact the preceding obstacle based on the traveling situation detection result of the traveling situation detecting section,
    the host vehicle behavior control section being further configured to execute braking control to avoid contact or reduce an impact of contact when the collision potential determining section has determined that the possibility of contact is high, the braking control being carried out via an intelligent brake assist device which overrides the driver's braking such that braking control is carried out without regard to the driver's braking efforts.

4. The vehicle driving assist system as recited in claim 1, further comprising
    a lateral position calculating section configured to calculate a lateral position of the host vehicle relative to a host vehicle traveling lane in which the host vehicle is traveling; and
    a lane departure determining section configured to determine a possibility that the host vehicle will depart from the host vehicle traveling lane based on the lateral position calculated by the lateral position calculating section, the host vehicle behavior control section being further configured to execute lane departure preventing control to prevent the host vehicle from departing from the host vehicle traveling lane when the lane departure determining section has determined that the possibility that the host vehicle will depart from the host vehicle traveling lane is high.

5. The vehicle driving assist system as recited in claim 4, wherein
the behavior control operating state notifying section is further configured to notify the driver by causing the accelerator pedal to exert a pulsed supplemental reaction force.

6. The vehicle driving assist system as recited in claim 4, wherein
the behavior control operating state notifying section is further configured to notify the driver by causing at least one of the accelerator pedal, a steering wheel and a seat to vibrate.

7. The vehicle driving assist system as recited in claim 1, wherein
the host vehicle behavior control section includes a deceleration force control section configured to generate a deceleration force against the host vehicle based on the risk potential.

8. The vehicle driving assist system as recited in claim 7, wherein
the behavior control operating state notifying section is further configured to notify the driver by causing at least one of the accelerator pedal, a steering wheel and a seat to vibrate.

9. The vehicle driving assist system as recited in claim 7, wherein
the behavior control operating state notifying section is further configured to notify the driver that the future operating state of the deceleration force control section is going to change when a deceleration generated by the deceleration force control section is predicted to exceed or fall below a prescribed deceleration after a prescribed amount of time has elapsed.

10. The vehicle driving assist system as recited in claim 9, wherein
the behavior control operating state notifying section is further configured to notify the driver by causing the accelerator pedal to exert a pulsed supplemental reaction force.

11. The vehicle driving assist system as recited in claim 9, wherein
the behavior control operating state notifying section is further configured to notify the driver by causing at least one of the accelerator pedal, a steering wheel and a seat to vibrate.

12. A vehicle equipped with the vehicle driving assist system according to claim 1.

13. A vehicle driving assist system comprising:
traveling situation detecting means for outputting a traveling situation detection result based on at least a following distance between a host vehicle and a preceding obstacle and a host vehicle speed of the host vehicle;
risk potential calculating means for calculating a risk potential indicative of a degree of convergence between the host vehicle and the preceding obstacle based on the traveling situation detection result;
actuation reaction force control means for controlling an actuation reaction force exerted by an accelerator pedal of the host vehicle based on the risk potential that was calculated;
host vehicle behavior control means for controlling a behavior of the host vehicle;
behavior control operating state notifying means for notifying a driver in advance of a future operating state of the host vehicle behavior control means while the actuation reaction force control means is executing control of the actuation reaction force exerted by the accelerator pedal;
driver operation recommendation means for providing the driver with a recommended driving operation in accordance with the future operating state of the host vehicle behavior control means, the recommended driving operation being distinct from notification to the driver of the future operating state; and
control state transition mode determination means for determining a control state transition mode that indicates how the future operating state of the host vehicle behavior control means will change,
the behavior control operating state notifying means notifying the driver in advance of the future operating state of the host vehicle behavior control means based on a result of a determination of the control state transition mode determination means, and the driving operation recommendation means determining the recommended driving operation based on the result of the determination of the control state transition mode determination means.

14. A vehicle driving assistance method comprising:
determining a risk potential indicative a degree of convergence between a host vehicle and a preceding obstacle based on at least a following distance between the host vehicle and the preceding obstacle and a host vehicle speed of the host vehicle;
controlling an actuation reaction force exerted by an accelerator pedal of the host vehicle based on the risk potential;
notifying a driver in advance of a future operating state of a host vehicle behavior control section configured to control a behavior of the host vehicle while control of the actuation reaction force is being executed in accordance with the risk potential;
providing the driver with a recommended driving operation in accordance with the future operating state of the host vehicle behavior control section, the recommended driving operation being distinct from notification to the driver of the future operating state; and
determining a control state transition mode that indicates how the future operating state of the host vehicle behavior control section will change,
with the notifying of the driver being accomplished in advance of the future operating state of the host vehicle behavior control section based on a result of the determining of the control state transition mode, and the recommended driving operation being recommended based on the result of the determining of the control state transition mode.

* * * * *